(12) United States Patent
Ho et al.

(10) Patent No.: US 8,854,620 B2
(45) Date of Patent: Oct. 7, 2014

(54) CURVED GRATING SPECTROMETER AND WAVELENGTH MULTIPLEXER OR DEMULTIPLEXER WITH VERY HIGH WAVELENGTH RESOLUTION

(71) Applicant: Seng-Tiong Ho, Wheeling, IL (US)

(72) Inventors: Seng-Tiong Ho, Wheeling, IL (US); Yingyan Huang, Wilmette, IL (US)

(73) Assignee: OptoNet Inc., Evanston, IL (US)

( * ) Notice: Subject to any disclaimer, the term of this patent is extended or adjusted under 35 U.S.C. 154(b) by 0 days.

(21) Appl. No.: 13/911,847

(22) Filed: Jun. 6, 2013

(65) Prior Publication Data

US 2013/0272695 A1 Oct. 17, 2013

Related U.S. Application Data

(60) Division of application No. 12/623,750, filed on Nov. 23, 2009, now Pat. No. 8,462,338, which is a continuation-in-part of application No. 11/872,455, filed on Oct. 15, 2007, now Pat. No. 7,623,235, which is a continuation-in-part of application No. 10/708,730, filed on Mar. 20, 2004, now Pat. No. 7,283,233.

(51) Int. Cl.

| | |
|---|---|
| *G01J 3/28* | (2006.01) |
| *G02B 6/293* | (2006.01) |
| *G01J 3/20* | (2006.01) |
| *H04B 10/07* | (2013.01) |
| *G01J 3/22* | (2006.01) |
| *G01J 3/02* | (2006.01) |

(52) U.S. Cl.
CPC ............ *H04B 10/07* (2013.01); *G02B 6/29328* (2013.01); *G01J 3/20* (2013.01); *G01J 3/22* (2013.01); *G01J 3/0256* (2013.01); *G02B 6/29326* (2013.01)
USPC ........................................ 356/328

(58) Field of Classification Search
USPC .................................. 356/328, 334
See application file for complete search history.

(56) References Cited

U.S. PATENT DOCUMENTS

| | | | |
|---|---|---|---|
| 4,027,975 A | * | 6/1977 | Turner et al. .................. 356/334 |
| 4,140,394 A | | 2/1979 | Roos |
| 4,380,393 A | | 4/1983 | Nagata et al. |
| 4,571,074 A | * | 2/1986 | Thevenon ........................ 356/51 |
| 4,820,046 A | | 4/1989 | Sohma et al. |

(Continued)

*Primary Examiner* — Tarifur Chowdhury
*Assistant Examiner* — Jonathan Cook
(74) *Attorney, Agent, or Firm* — Andrus Intellectual Property Law, LLP

(57) ABSTRACT

The present application discloses a system comprising a compact curved grating (CCG) and its associated compact curved grating spectrometer (CCGS) or compact curved grating wavelength multiplexer/demultiplexer (WMDM) module and a method for making the same. The system is capable of achieving a very small (resolution vs. size) RS factor. In the invention, the location of the entrance slit and detector can be adjusted in order to have the best performance for a particular design goal. The initial groove spacing is calculated using a prescribed formula dependent on operation wavelength. The location of the grooves is calculated based on two conditions. The first one being that the path-difference between adjacent grooves should be an integral multiple of the wavelength in the medium to achieve aberration-free grating focusing at the detector or output slit (or output waveguide) even with large beam diffraction angle from the entrance slit or input slit (or input waveguide). The second one being specific for a particular design goal of a curved-grating spectrometer. In an embodiment, elliptical mirrors each with focal points at the slit and detector are used for each groove to obtain aberration-free curved mirrors.

7 Claims, 16 Drawing Sheets

(56) References Cited

U.S. PATENT DOCUMENTS

| | | | |
|---|---|---|---|
| 5,066,127 A * | 11/1991 | Schwenker | 356/328 |
| 5,114,231 A | 5/1992 | Gautherin et al. | |
| 6,339,662 B1 | 1/2002 | Koteles et al. | |
| 6,878,562 B2 | 4/2005 | Ooi et al. | |
| 7,283,233 B1 | 10/2007 | Ho | |
| 2004/0196458 A1* | 10/2004 | Shimizu et al. | 356/328 |

* cited by examiner

CURVED GRATING SPECTROMETER AND WAVELENGTH MULTIPLEXER OR DEMULTIPLEXER WITH VERY HIGH WAVELENGTH RESOLUTION

CROSS REFERENCE TO RELATED APPLICATIONS

This application is a Divisional of U.S. patent application Ser. No. 12/623,750, filed Nov. 23, 2009, which is a Continuation-In-Part of U.S. patent application Ser. No. 11/872,455 filed Oct. 15, 2007, now U.S. Pat. No. 7,623,235, which is a Continuation-in-Part of U.S. patent application Ser. No. 10/708,730, filed. Mar. 20, 2004, now U.S. Pat. No. 7,283,233. This application is related to U.S. patent application Ser. No. 09/916,701, "Method for shifting bandgap energy of quantum well layer" filed Jul. 26, 2001 in the names of Boon-Siew Ooi and Seng-Tiong Ho, the disclosure of which is incorporated herein by reference. This application is related to U.S. Patent Application Ser. No. 60/242,219, "Method for shifting bandgap energy of quantum well layer" filed. Oct. 20, 2000 in the names of Boon-Siew Ooi and Seng-Tiong Ho, the disclosure of which is incorporated herein by reference. This application is related to U.S. Patent Application Ser. No. 60/430,507, "Method for quantum-well intermixing using pre-annealing enhanced defect diffusion" filed Dec. 3, 2002, in the names of Boon-Slew Ooi and Ruiyu (lane) Wang, the contents of which are incorporated herein by reference in their entireties.

BACKGROUND OF THE INVENTION

The present invention relates to semiconductor photonic and opto-electronic devices. In particular, the present invention relates to an integrated optical wavelength multiplexers and demultiplexers and method of making the same.

Optical gratings are well known in the art and are used to disperse optical spectra spatially. Such gratings are commonly used in optical spectrometers to analyze the spectra composition of an optical beam. There is always a trade off between the length of an optical spectrometer and its resolution. Thus, if a higher wavelength resolution is required, the length required is also longer. Consider an example of a typical 1-meter long grating spectrometer in the market, which has a wavelength resolution of about $\Delta\lambda=0.1$ nm at $\lambda=1000$ nm or $\Delta\lambda/\lambda=10^{-4}$. The dimensionless quantity for the length of the spectrometer L is $L/\lambda$ and $L/\lambda=10^6$ in this example. The dimensionless product of the relative resolution $\Delta\lambda/\lambda$ and the relative physical size $L/\lambda$ of the spectrometer is dependent on the design of the spectrometer and in this example, spectrometer gives $(\Delta\lambda/\lambda)\times(L/\lambda)=100=RS$. This factor (RS) in generally referred to as the "resolution vs size" factor. RS basically measures the compactness of a spectrometer for a given resolution power. The smaller the RS value, the more compact is the spectrometer. Only a few conventional spectrometers have RS factor less than about 10. This is primarily because of the various limitations in the current art (as will be described below).

It is known in the art that a relatively compact spectrometer can be achieved using a curved grating. The schematics of such a grating spectrometer is shown in FIG. 1A, illustrating an optical beam 1 entering an entrance slit 2 with slit size $w_1$. The beam, after slit 2, undergoes wave diffraction towards a curved grating 3, which diffracts the beam spatially in a direction that is dependent on the optical wavelength of the beam. The curvature of the grating helps to refocus the diffracted beam to an exit slit 4 with slit size $w_2$. Note that the term "exit slit" is also referred to as "outout slit" below so that the terms "exit slit" and "output slit" will be used totally interchangeably. Similarly, the terms "entrance slit" and "input slit" will be used totally interchangeably/Light through slit 4 is then detected by a photo detector 5. As is well known to those skilled in the art, the commonly used design for the curved grating 3 is the Rowland design. In the Rowland design, the grating has a circularly curved shape of radius R 6 and the slits SL1 and SL2 lie in a circle of radius R/2 7 as shown in FIG. 1A. The grating is ruled using a diamond tip with constant horizontal displacement d, which ruled the curved surface with constant Chord lines C1, C2, C3 and so forth, as shown in FIG. 1B. The segment lengths, S1, S2, S3 and so forth, along the curved surface are not a constant and vary along the curved surface.

Let the diffraction full angle from the entrance slit 1 be $\theta_{div}$ (defined by the angle of beam propagation at full-width half maximum (FWHM) of the beam intensity) As is well known to those skilled in the art, $\theta_{div}=2\lambda/d$ (in Radian). Let length L be the distance between the grating center and entrance slit 1, which is also approximately the distance between the grating center and the exit slit 4. As is well known to those skilled in the art, the resolution of the spectrometer increases with decreasing slit size $w_2$. The imaging through the curved grating requires $w_1$ and $w_2$ to be about equal. A smaller slit size $w_1$, however, leads to a larger diffraction angle $\theta_{div}$. It can be shown that the Rowland design works reasonably well up to $\theta_{div}<4°$. When $\theta_{div}>4°$, the Rowland design could not give a sharp enough focus at the exit slit 4 (for $\Delta\lambda<0.1$ nm), thereby limiting the size of $w_2$ and hence the resolution of the spectrometer. A diffraction angle of $\theta_{div}=4°$ corresponds to a slit size of about 25 microns (for $\lambda=1000$ nm). In the current art, it is typically difficult to make slit size smaller than 25 microns, and Rowland design is adequate for most present spectrometers with slit sizes larger than 25 microns.

Aberration Limitation:

In the case of the Rowland design, when $\theta_{div}>4$ Degree(s) (DEG), serous aberration in the refocusing beam will occur to limit wavelength resolution. This is shown in FIG. 1C illustrating the ray tracing for the typical Rolwand-Echelle design at 4, 8, and 16 DEG diffraction. The ray tracing will allow us to see potential focusing distortion or aberration at the exit slit. In the figure, we show the focusing behavior for two sets of rays with wavelengths separated by 0.4 nm. From the figure, we see that their focused spots clearly separate when $\theta_{div}=4$ DEG. However, when $\theta_{div}=8$ DEG, the focused spots began to smear out. There is substantial distortion for the focusing rays when $\theta_{div}>4$ DEG. Further simulations based on numerical solutions to Maxwell's wave equations using finite-difference time-domain (FDTD) method also show similar onset of focused spot size distortion at $\theta_{div}>4$ DEG. In short, the current designs are close to their resolution-size (RS) limits at $\theta_{div}$ of about 4 DEG and cannot be made substantially more compact without losing wavelength resolution.

As discussed above, a curved-grating spectrometer is well specified by geometric configurations of its components as shown in FIG. 2. First, the location of the entrance slit; this is usually given by an $\theta_1$ with respect to the normal of the grating center and the distance $S_1$ from the grating center. The center of the grating refers to the part of the grating hit by the center, i.e. high intensity point, of the entrance beam. Second, the locations of the first two grooves at the grating center; these are specified by its location vectors $X_1$ and $X_{(-1)}$ with respect to the grating center as the origin of a two-dimensional (2-D) x-y coordinate system with coordinates (x,y)=(0,0). Let the 2-D vector at the origin be $X_0=(0,0)$ and its groove spacing (or pitch) $d_1=|X_1-X_0|$ and $d_{-1}=|X_{(-1)}-X_0|$, where the 2-D vectors $X_1$ and $X_{(-1)}$ are originated from or pointinging from $X_0$ and are located symmetrically opposite to each other with respect to the grating center and therefore $d=d_1=d_{(-1)}$. A circle can be defined by these three points $X_0$, $X_1$, and $X_2$ and its radius is referred to as the radius of curvature at the grating center. Third, the location of the exit slit i.e. the location of the detector; this is specified by an angle $\theta_2$ with respect to the normal of the grating center and the distance $S_2$ from the grating center. For a given operating wavelength center $\lambda_c$, the initial groove spacing d is usually chosen to satisfy the diffraction grating formula for a given entrance slit and detector location. The curved grating is further specified by the location of other grooves (specified by its location vector $X_i$, with respect to the grating center $X_0=(0,0)$ and the groove spacing $d_i$ from the previous groove given by $d_i=|X_i X_{i-1}|$. Let the total number of grooves be N in each side of the grating center, the locus of all the grooves defined by the line that joins all tips of the vectors $X_{(-N)}, \ldots, X_{(-1)}, X_0, X_1, \ldots, X_N$ form a curved shape, which can lie in a circle or in any other curvilinear line. Curved shape of the grating acts as an imaging element of the spectrometer.

The shape of each groove centered at $X_i$ is not critical to the resolution power of the grating and hence is not necessary to be a part of the main specification. However, the groove shape is related to the diffraction efficiency. For example, in order to increase the diffraction efficiency at a particular diffraction angle $\theta_2$, it is typically made a planar surface for each groove, oriented in such a way that it acts like a tiny mirror reflecting the input ray towards the angle $\theta_2$, a process typically referred to as blazing to angle $\theta_2$ (for a given wavelength $\lambda$). A section of each groove which reflects light is physically a two-dimensional surface of a particular shape, not a one-dimensional curve. However, the geometric shape of a groove is usually referred to as a one-dimensional curve of a particular shape. This is because there is no variation in the grating shape in the direction perpendicular to the plane where grating lies. Especially, spectrometers within a planar waveguide are strictly two-dimensional in their nature and the shape of grating or grooves will be referred with a curve, not with surface.

Conventional Rowland design spectrometers are specifically configured by the design rule described below in conjunction with FIG. 3.

Referring to FIG. 3, the entrance slit SL1 is located on a circle of R/2, where R is the radius of curvature of the grating at the grating center. This curvature at the grating center is called the grating-center curve. This circle of radius R/2 is called the Rowland circle and it is tangent to (i.e. passing through) the grating center. In the Rowland design, the distance $S_1$ of the entrance slit to the grating center is related to the angle of incidence $\theta_1$ by $S_1=R^*\mathrm{Cos}(\theta_1)$, where "*" denotes numerical multiplication.

The detector is also located on the same Rowland circle as the entrance slit SL2. In the Rowland design, the distance $S_2$ of the detector to the grating center is related to the angle of diffraction $\theta_2$ by $S_2=R^*\mathrm{Cos}(\theta_2)$.

During operation, an input light beam from the entrance slit will propagate to the grating and the different frequency components of the light beam will be dispersed by the grating to different directions. Part of the dispersed light then propagates to the output detector. The medium in which the light propagates in can be air or a material medium with an effective refractive index of propagation "n". In the case of free space, "n" is the material refractive index. In the case of a planar waveguide, "n" is the effective refractive index of propagation within the planar waveguide.

The relation between $\theta_1$, $\theta_2$, and the initial groove spacing d is given by the grating formula, $$d^*(\mathrm{Sin}(\theta_2)-\mathrm{Sin}(\theta_1))=m^*\lambda_c/n \qquad (0)$$

where m is the diffraction order, n is the effective refractive index of propagation of the medium, $\lambda_c$ is the center of the operation wavelength. This grating formula is a so-called far-field approximation, which is valid only when $S_1$ and $S_2$ are much larger than d.

Initial groove positions are $X_0=(0,0)$, $X_1=(d, R-(R^2-d^2)^{1/2})$ and $X_{-1}=(-d, R-(R^2-d^2)^{1/2})$. These three initial grooves with position vectors $X_0$, $X_1$, and $X_{-1}$, are located on a circle of radius R and have the initial groove spacing of d along a chord (CD in FIG. 3) parallel to the grating tangent (AB in FIG. 3). The grating tangent is a line segment tangent to the grating-center curve.

All other grooves, specified by its position vector $X_i$'s, are located on the same circle of radius R defined by the initial three groove positions X, X, and $X_{-1}$. $X_i$'s are also equally spaced along a chord that is parallel to the tangent of the grating-center curve. In other words, the projection of the displacement vector $X_i-X_{i-1}$ on this chord always has the same length. Specifically, the position vectors of the grooves can be written as $X_i=(d^*i, R-(R^2-(d^*i)^2)^{1/2})$, and $X_{-i}=(-d^*i, R-(R^2-(d^*i)^2)^{1/2})$, where "*" denotes numerical multiplication and "i" is a positive integer denoting the $i^{th}$ groove so that "i" can take any of the values 0, 1, 2, 3, 4, ... etc.

For example, if the radius of curvature at the grating center is r=100 µm, the Rowland circle, where the entrance slit and the detector are located, has the radius of 50 µm. Here, we assume that tangent line at the grating-center curve is parallel to the x-axis. Since the Rowland circle is tangent to the grating-center curve, it circles by passing both the grating center $X_0=(0,0)$ and a point $(0, 50)$. If the angle of the entrance slit is $\theta_1=45°$, the distance of the entrance slit to the grating center is $S_1=R^*\mathrm{Cos}(\theta_1)=70.71$ µm. In terms of (x,y)-coordinate, the entrance slit is located at $(-50, 50)$. It is well-known that grating is more efficient if the propagation direction of the diffracted light from the grating is nearly parallel and opposite to the propagation direction of the input beam. Such a scheme is known as Littrow configuration and is widely used for a high-efficiency spectrometer. A Littrow configuration in the Rowland design will be equivalent to having the angle of detector being almost equal to the angle of the entrance slit, i.e., $\theta_1 \approx \theta_2$. Besides being at the Littrow configuration, the groove spacing d at the grating center has to be properly chosen so that it satisfies grating formula Eq. 0. For example, when the center wavelength is 1550 nm and the angle of entrance slit is $\theta_1=45°$, the diffraction order of m=12 of a grating with the groove spacing of d=4.2 µm at its center propagate toward a detector located at $\theta_2=37.37°$, which is close to the Littrow configuration. The detector location can be fine tuned by changing the initial groove spacing d. Lower the groove spacing d, larger the detector angle $\theta_2$. For the groove spacing d=4.2 µm and radius of curvature R=100 µm, the initial three positions of grooves are $X_0=(0,0)$, $X_1=(4.2, 0.088)$ and $X_{-1}=(-4.2, 0.088)$.

In the Rowland design, other grooves are located such that their spacing is the same along a chord parallel to the grating tangent at the center. Therefore, the position vectors of other grooves are $X_i=(d^*i, R-(R^2-(d^*i)^2)^{1/2})=(4.2^*i, 100-(100^2-(4.2^*i)^2)^{1/2})$, and $X_{-i}=(-d^*i, R-(R^2-(d^*i)^2)^{1/2})=(-4.2^*i, 100-(100^2-(4.2^*i)^2)^{1/2})$. The position vectors of the grooves are listed in the following table for the case of Rowland design with R=100 µm, d=4.2 µm, m=12, $\theta_1=45°$, and $\theta_2=37.37°$ for an operation wavelength of $\lambda_c=1550$ nm.

TABLE 1

| | |
|---|---|
| $X_{-13}$ | (−54.6, 16.221) |
| $X_{-12}$ | (−50.4, 13.630) |
| $X_{-11}$ | (−46.2, 11.312) |
| $X_{-10}$ | (−42, 9.248) |
| $X_{-9}$ | (−37.8, 7.419) |
| $X_{-8}$ | (−33.6, 5.814) |
| $X_{-7}$ | (−29.4, 4.419) |
| $X_{-6}$ | (−25.2, 3.227) |
| $X_{-5}$ | (−21, 2.230) |
| $X_{-4}$ | (−16.8, 1.421) |
| $X_{-3}$ | (−12.6, 0.797) |
| $X_{-2}$ | (−8.4, 0.353) |
| $X_{-1}$ | (−4.2, 0.088) |
| $X_0$ | (0, 0) |
| $X_1$ | (4.2, 0.088) |
| $X_2$ | (8.4, 0.353) |
| $X_3$ | (12.6, 0.797) |
| $X_4$ | (16.8, 1.421) |
| $X_5$ | (21, 2.230) |
| $X_6$ | (25.2, 3.227) |

The advent in Dense Wavelength Division Multiplexing (DWDM) optical communication networks, however, requires that the multiple wavelengths in an optical fiber to be analyzed by spectral analysis devices that are much smaller in size than that of the current grating spectrometer. The challenge is to circumvent the current limitation in grating spectrometer design and fabrication methods. As discussed above, the current design basically cannot achieve the Resolution-Size factor (RS) much smaller than about 10. While several current technologies are capable of using planar waveguide technologies to make grating based spectrometers on a single silica or semiconductor substrate, they are still not able to achieve RS much smaller than 10 due to the basic limitations of the grating spectrometer design. Achieving a smaller RS factor is important for combining or integrating high-resolution grating spectrometers or wavelength multiplexer (Mux) and demultiplexer (deMux) with various photonic devices (such as lasers, modulators, or detectors in a compact module or silica/silicon/semiconductor wafer).

These wavelength-division-multiplexed (WDM) integrated photonic devices or modules would be of great importance for applications to Dense Wavelength Division Multiplexed (DWDM) networks. The costs of these integrated WDM devices are typically proportional to their sizes. The wavelength dispersion elements, such as the grating spectrometer or other form of wavelength filters and wavelength Mux/deMux, are typically about 100 times larger in size than any other photonic devices in the module or wafer. In order to reduce their costs substantially, it is desirable to reduce the size of these wavelength dispersion elements to as small a size as possible.

Thus, it is desirable to have grating based spectrometers that have an RS factor of less than 10. It is also desirable to reduce the size, and hence the cost, of integrated WDM devices that are used in DWDM networks. The present invention discloses such a device and a method for making the same.

SUMMARY OF THE INVENTION

It is an aim of the invention to provide a compact curved grating and associated compact curved grating spectrometer or wavelength Mux/deMux with integration possibility that is capable of achieving very small RS factors thereby enabling high resolution at small size.

It is another aim of the invention to provide a compact curved grating spectrometer module that can be used as an isolated optical spectrometer or discrete optical spectrometer module or wavelength Mux/deMux module with integration possibility and that can be used as an isolated optical spectrometer using discrete optical components.

It is another aim of the invention to provide a compact curved grating spectrometer module that can be used as a wavelength dispersion element in a photonic integrated circuit.

In order to attain the above-mentioned aims, a compact curved grating and associated compact curved grating spectrometer or wavelength Mux/deMux with integration possibility is provided. The compact curved grating spectrometer includes an entrance slit, a detector and a curved grating and the compact curved grating wavelength Mux/deMux with integration possibility includes a curved grating, at least an input slit or waveguide and at least an output slit or waveguide for propagating through at least an input light beam and at least an output light beam, respectively. The locations of the entrance slit and the detector or the input slit (or waveguide) and the output slit (or waveguide) can be adjusted to control the performance of the spectrometer or wavelength Mux/deMux. The distance between the grooves of the gratings depend on the location of the entrance slit or the input slit (or waveguide), the detector or the output slit (or waveguide), the center of the operation wavelength, the diffraction order and the refractive index of the medium.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION

The present invention discloses a system comprising a compact curved grating (CCG), it associated compact curved grating spectrometer (CCGS) or wavelength Mux/deMux (WMDM) module and a method for making the same. The system is capable of achieving very small (resolution vs. size) RS factor. The uses of CCGS or WMDM module include an isolated optical spectrometer or wavelength Mux/deMux using discrete optical components such as slits, grating, spectrometer or wavelength Mux/deMux casing, detector, detector array, and motor drive. More generally, the CCGS or WMDM module could also be used as a wavelength dispersion element in a photonic integrated circuit. The photonic integrated circuit can be based on various materials including but not limited to glass (silica) waveguide, semiconductor waveguide, polymer nwaveguide, or any other type of optical waveguiding devices. Semiconductor waveguides include silicon or compound semiconductor waveguides such as III-V (GaAs, InP etc). The wavelength dispersion element based on the CCGS or WMDM module in the photonic integrated circuit can be integrated with optical detector, laser, amplifier, waveguide, modulator, splitter, multimode interference devices, other wavelength filters, array-waveguide-based devices, and other photonic devices, materials, or components to achieve a multi-component photonic integrated circuit with useful functionalities. The CCG explained below is a High-Resolution Compact Curved Grating (HR-CCG) that tries to alleviate the disadvantages associated with prior art mentioned earlier, by providing a high resolution in a small (compact) module.

Figure 5A:
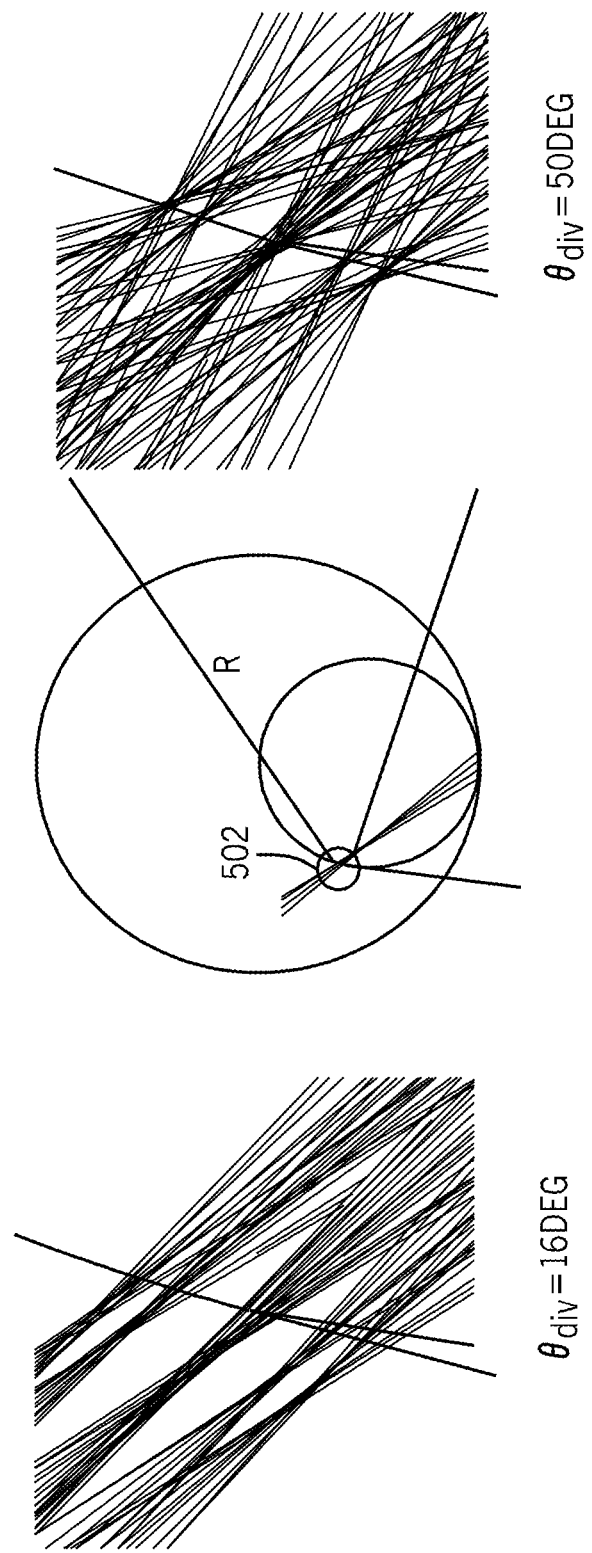
FIG. 5A describes the Comparison of angular resolution for Rowland grating (left) with input divergence angle 16 DEG and the High-Resolution Compact Curved Grating (HR-CCG) design with large-angle aberration correction at input divergence angle 50 DEG (right)

We have improved on the current Rowland design, enabling curved-grating spectrometer with 10-100× smaller linear size (or 100-10,000× smaller area) using our HR-CCG with large-angle aberration-corrected design. The typical Rowland design can only reach a useful diffraction angle $\theta_{diff}$ of ~4 DEG, beyond which serous aberration in the refocusing beam will occur to limit wavelength resolution. In FIG. 5A we show the angular resolution of the typical Rowland design at 16 DEG diffraction angle compared with our HR-CCG design at 50 DEG. We see that our "large-angle aberration-corrected grating" design has much better angular resolution: different direction rays are well converged to a point on the focal circle. This translates to much smaller RS factor or size. We have used discrete time solution of vectorial Maxwell's equations to simulate the HR-CCG design, which verified the high resolution nature of our grating as predicted by the ray-tracing method.

Figure 9:
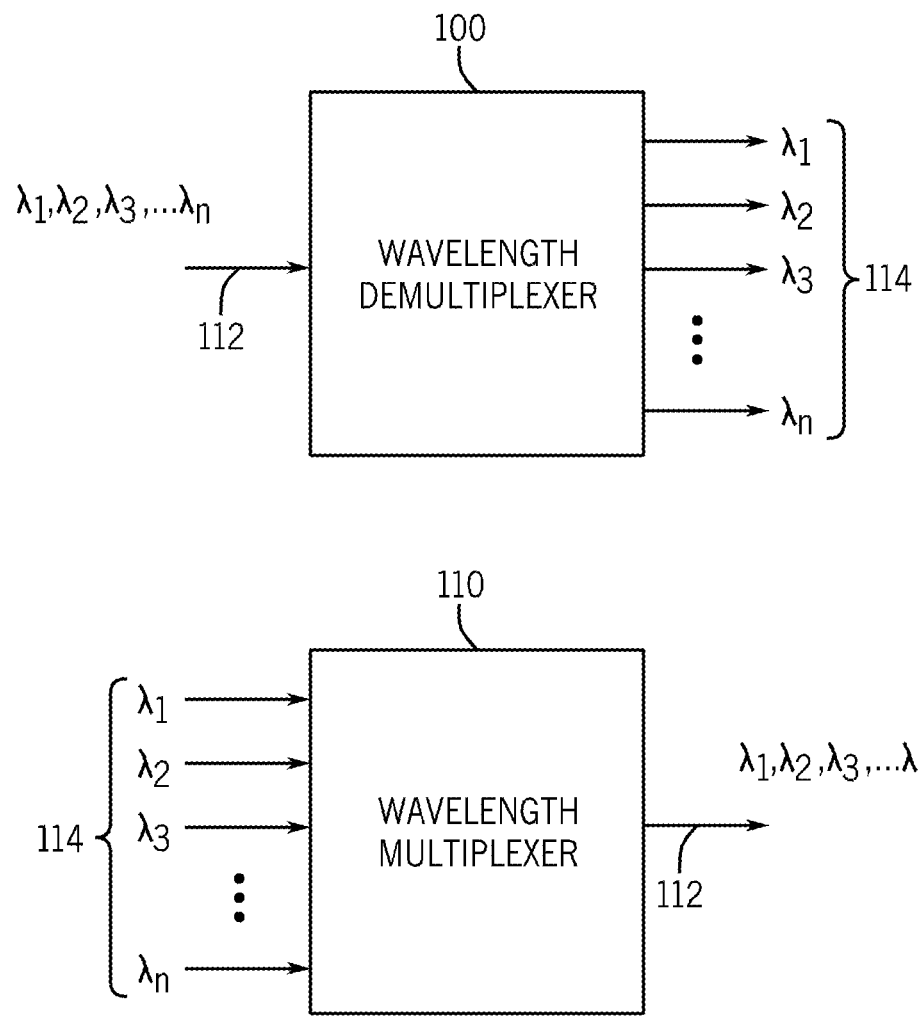
FIG. 9 illustrates a block diagram of a wavelength demultiplexer and a wavelength multiplexer.

Referring to FIG. 9, a wavelength demultiplexer (wavelength deMux) 100 is a device in which multiple wavelengths in a beam of light 112 are separated into several different beams of light 114. A wavelength multiplexer (wavelength Mux) 110 is a device in which multiple wavelengths in several beams of light 114 are combined to a single beam of light 112.

Figure 10:
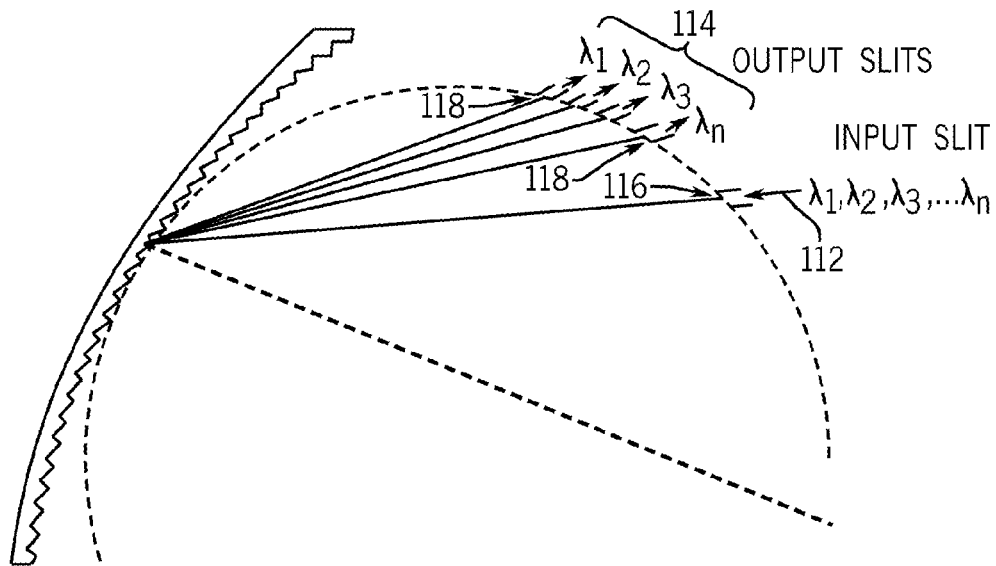
FIG. 10 illustrates a curved grating spectrometer configured as a wavelength multiplexer.

Referring to FIG. 10, a curved grating spectrometer functions as a wavelength deMux 100 if it has an input slit 116 at the input beam 112 location so that the multiple wavelengths in the input beam will be diffracted to several output points 114 and several output slits 118 are placed at the locations of the spectrometer detectors mentioned above at these output points to form several output beams each with a different wavelength. The output slits 118 replace the detectors so that no detectors will be used.

Figure 11:
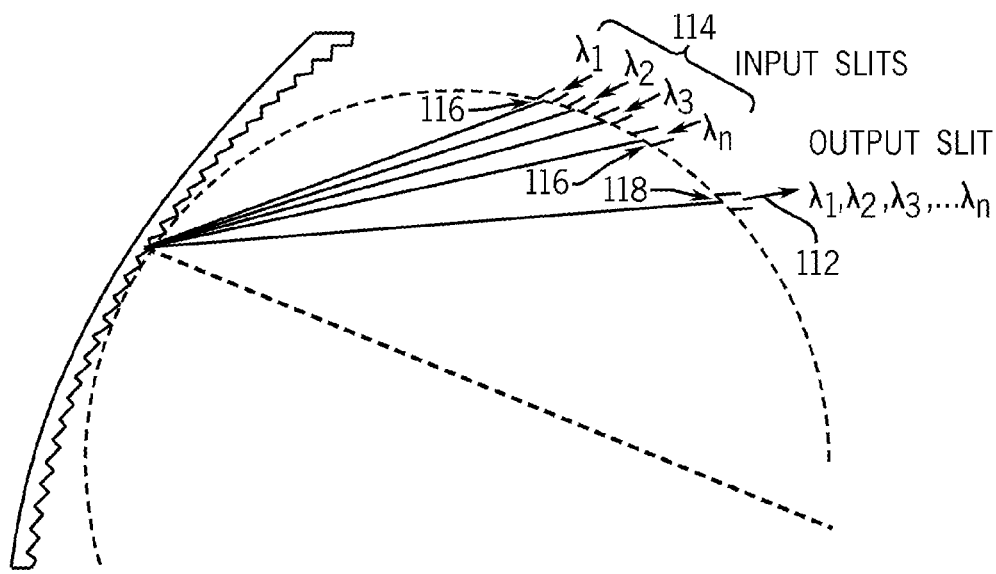
FIG. 11 illustrates a curved grating spectrometer configured as a wavelength multiplexer.

Referring to FIG. 11, a curved grating spectrometer functions as a wavelength Mux 110 if it has multiple input slits 116, each slit placed at an input beam's 114 location so that all the input beams 114 will be diffracted to the same output point and an output slit 118 is placed at the location of the spectrometer detector mentioned above so that the output slit 118 will give a single output beam of light 112 with the combined wavelengths of light. The output slit 118 replaced the detector so that no detector will then be used.

Figure 12:
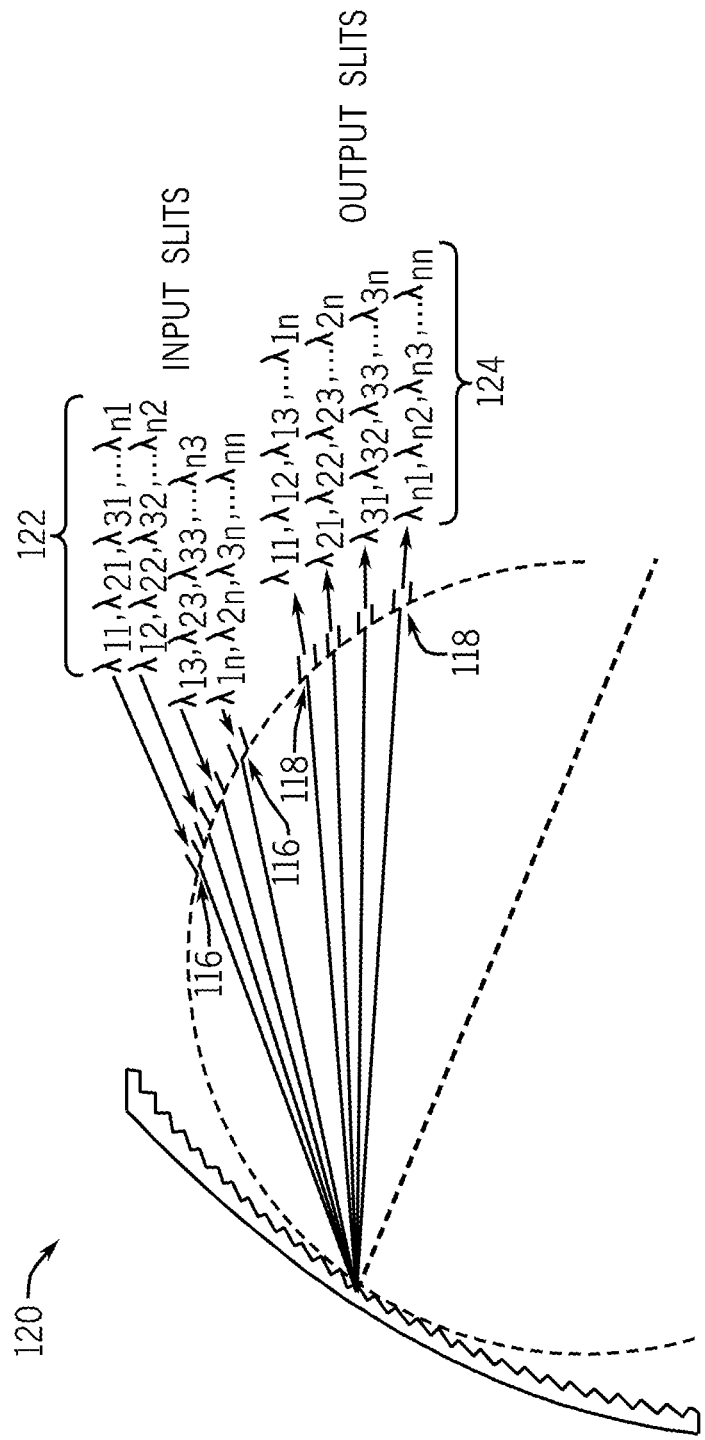
FIG. 12 illustrates a curved grating spectrometer configured as a wavelength multiplexer/demultiplexer.

Referring to FIG. 12, a more general wavelength Mux/deMux device 120 will have multiple input slits 116 and multiple output slits so that several input beams of light 122, each input beam with one or more wavelengths, are dispersed to form several output beams of light 124, each output beam with one or several wavelengths.

Figure 13:
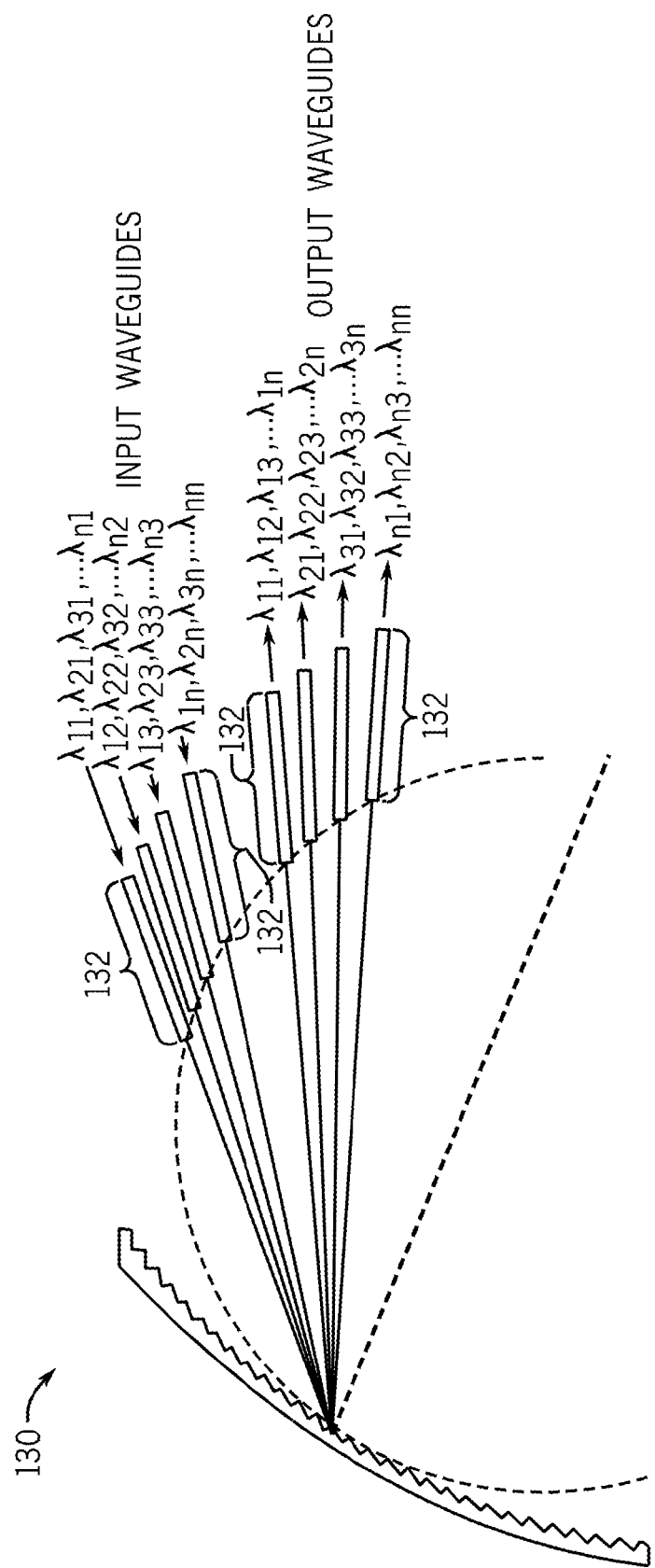
FIG. 13 illustrates a wavelength spectrometer configured as a multiplexer/demultiplexer with waveguides.

Referring to FIG. 13, an integrated version of the wavelength Mux/deMux device 130 will use optical channel waveguides 132 replacing input and output slits in which the mouth of each channel waveguide 132 will be at the location of the slit it is replacing. As is known to those skilled in the art, the waveguides 132 can be formed by optical fibers or with multiple-layer dielectric materials with high-refractive-index core to guide optical waves in the form of channel or planar waveguides 132. Such channel or planar waveguides can be formed on a common substrate. In an exemplary embodiment, the input channel waveguide is connected to a planar waveguiding region that propagates the beam from the input waveguide mouth towards a grating etched vertically into the planar waveguide material. The back side of the grating (the side away from the planar waveguiding region) can be coated with metallic gold reflector. The beam diffracted from the grating is then coupled into an outout channel waveguide. The mouth of the output waveguide then acts as the exit slit or output slit. The width of the input waveguide mouth then defines the width of the input slit and the width of the output waveguide mouth defines the width of the output slit. Furthermore, the location of the input waveguide mouth defines the location of the input slit and the location of the output waveguide mouth defines the location of the output slit. Below, when referring to the location of the input or output waveguide, it shall be taken as the location of the mouth of the input or output waveguide.

Figure 5B:
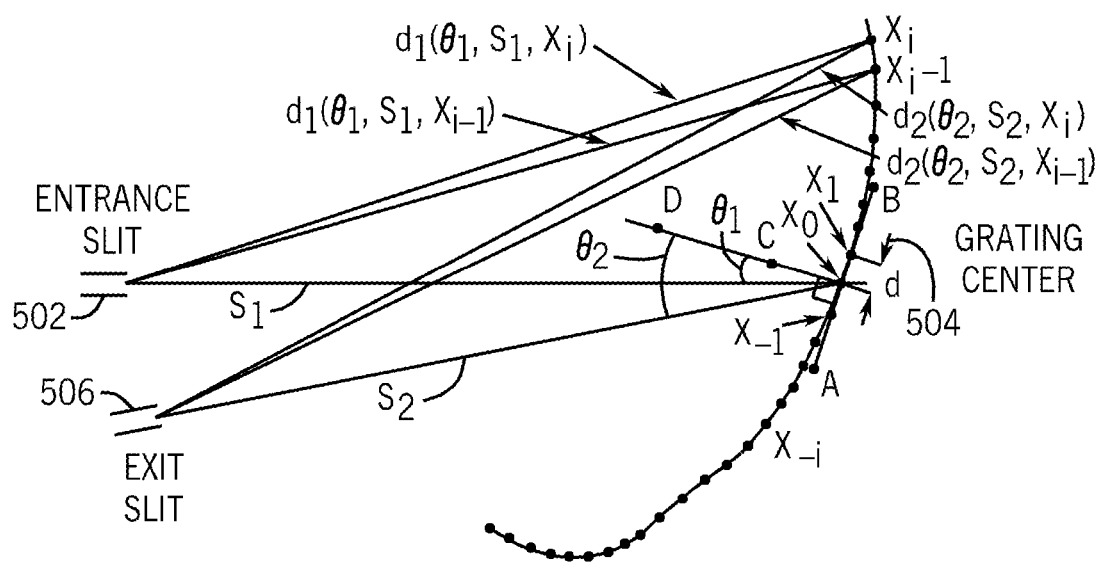
FIG. 5B describes High Resolution Compact Curved Grating specifications in accordance with a preferred embodiment of the present invention.

Referring back to FIG. 5B, the location of entrance slit or input slit (or waveguide) 502 can be adjusted in order to have the best performance for a particular design goal. Thus, the location of an input slit (or waveguide) 502 specified by angle $\theta_1$ with respect to the normal of grating center 504 and the distance $S_1$ from grating center 504 is not necessarily on a circle as in the case for Rowland design mentioned in the prior art. The normal of grating center 504 is a line segment (line EF in FIG. 5B) that is perpendicular to the tangent to the grating-center curve (line AB in FIG. 5B).

Second, the location of detector or output slit (or waveguide) can be adjusted in order to have the best performance for a particular design goal. Thus, the location of detector or output slit (or waveguide) 506, specified by the angle $\theta_2$ with respect to the normal of grating center 504 and the distance $S_2$ from the grating center is not necessarily on the same circle where entrance slit or input slit (or waveguide) 502 is located, nor on any other circle.

Third, The relation between $\theta_1$, $\theta_2$, and the initial groove spacing d is given by the grating formula, $$d*(\text{Sin}(\theta_2)-\text{Sin}(\theta_1))=m*\lambda_c/n \quad (1)$$

where m is the diffraction order, n is the effective refractive index of propagation of the medium, and $\lambda_c$ is the center of the operation wavelength.

Fourth, the initial groove positions are $X_0=(0,0)$, $X_1=(d, R-(R^2-d^2)^{1/2})$ and $X_{-1}=(-d, R-(R^2-d^2)^{1/2})$ With these position vectors, three initial grooves are located on a circle radius R and have the initial groove spacing of d at the grating center. This circle segment of radius R at the grating center then forms the grating-center curve.

Fifth, location of other grooves $X_i$'s are obtained by two conditions. The first of these conditions being that the path-difference between adjacent grooves should be an integral multiple of the wavelength in the medium. The first condition can be expressed mathematically by:

$$[d_1(\theta_1,S_1,X_i)+d_2(\theta_2,S_2,X_i)]-[d_1(\theta_1,S_1,X_{i-1})+d_2(\theta_2,S_2,X_{i-1})]=m*\lambda/n, \quad (2)$$

where $d_1(\theta_1,S_1,X_i)$ is the distance from a i-th groove located at $X_i$ to input slit (or input waveguide) 502 specified by $\theta_1$ and $S_1$, $d_2(\theta_2,S_2,X_i)$ is the distance from i-th groove located $X_i$ to detector or output slit (or waveguide) 502 specified by $\theta_2$ and $S_2$, m is the diffraction order, and n is the effective refractive index of propagation of the medium. This mathematical expression is numerically exact for the optical path difference requirement in the diffraction grating and is actively adjusted for every groove on HR-CCG.

The second of these conditions being specific for a particular design goal of a curved-grating spectrometer. The second condition in general can be mathematically expressed as $$f(\theta_1,S_1,\theta_2,X_i,X_{i-1},\lambda_c,n,m)=\text{constant} \quad (3)$$

Specific examples of the second condition are described later in the application. The unknown real variables in both equations Eq. (2) and Eq. (3) are x- and y-coordinates of the location vector $X_i$ of the i-th groove. For given input-slit (or inupt-waveguide) location $(\theta_1, S_1)$, detector or output slit (or waveguide) 506 location $(\theta_2, S_2)$, and the previous, i.e., (i-1)-th, groove position $X_{i-1}$, $X_i$ is completely specified by equations Eq. (2) and Eq. (3) for a given center wave-length $\lambda_c$, effective refractive index of propagation n, and the diffraction order m.

The last of the HR-CCG specification ensures that every ray from each groove focuses to a single point. This ensures HR-CCG having a large acceptance angle, and therefore a small spot size.

Figure 6:
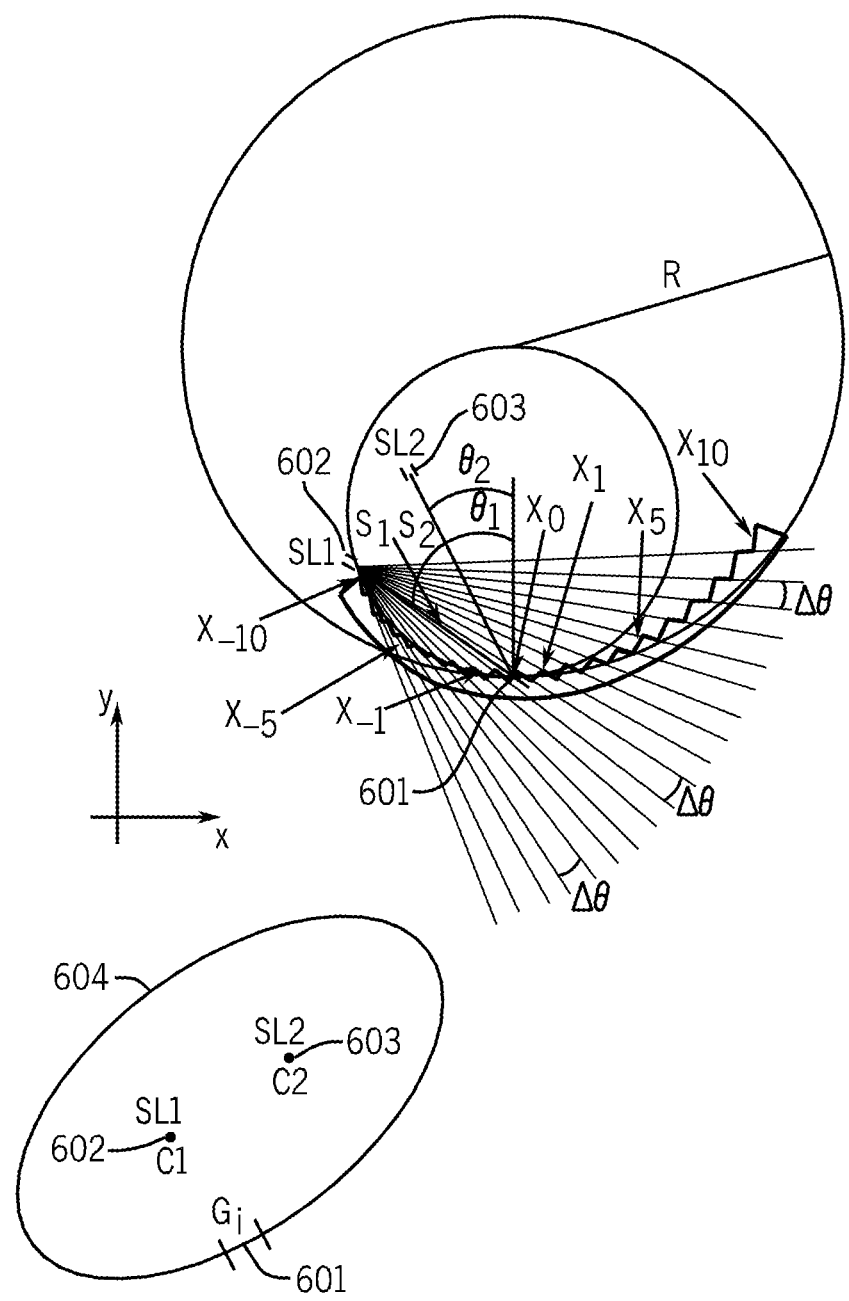
FIG. 6 illustrates an example of High Resolution Compact Curved Grating with constant angle (the Constant-Angle Case)

An exemplary embodiment of HR-CCG specified above is shown in FIG. 6. The radius of curvature at the grating center is R=50 μm. Entrance slit or input slit (or waveguide) 502 is located at an angle $\theta_1=55°$ from the grating normal and distance $S_1=28.68$ μm from the grating center. Detector or output slit (or waveguide) 506 is located at an angle $\theta_2=27.2°$ the grating normal and distance $S_2=37.65$ μm from the grating center. The groove spacing at the grating center is chosen to be d=3.6 μm so that diffraction order m=10 is directed toward detector or output slit (or waveguide) SL2 located at $\theta_2$. As shown in FIG. 6, entrance slit or input slit (or waveguide) SL1 and detector or output slit (or waveguide) SL2 are not located on a circle tangent to the grating-center. Three initial grooves are located at $X_0=(0, 0)$, $X_1=(3.6, 0.13)$, and $X_{-1}=(-3.6, 0.13)$ which form a circle radius R=50 μm. This circle segment then forms the grating-center curve. Other groove locations $X_i$'s are obtained with the condition of each groove having a constant angular spacing from entrance slit or input slit (or waveguide) SL1 and optical path-difference condition (Eq. 2) (the Constant-Angle Case). In a mathematical form, this second condition described by the general equation Eq. (3) is expressed as, $$\text{Cos}(\Delta\theta_i) = \left[\frac{(X_i - X_{in})\cdot(X_{i-1} - X_{in})}{|X_i - X_{in}| * |X_{i-1} - X_{in}|}\right] = \text{constant} \quad (4)$$

where $X_{in}=(-S_1*\text{Sin}(\theta_1), S_1*\text{Cos}(\theta_1))$ is the position vector of entrance slit SL1, $X_{det}=(-S_2*\text{Sin}(\theta_2), S_2*\text{Cos}(\theta_2))$ is the position vector of detector or output slit (or waveguide) SL2, and $\Delta\theta_i$ is the difference in angular position between successive $i^{th}$ and $(i-1)^{th}$ grooves. In Eq. 4, operator "·" means the inner product in vector analysis and defined as $A\cdot B \equiv |A|*|B|*\text{Cos}(\theta)$. The vertical bar "|" indicates taking the absolute value or the length of a vector. Because $\Delta\theta_i$ is constant for all grooves, it is same as the angular position difference between the center groove at $X_0$ and the first groove at $X_1$, i.e.

$$\Delta\theta_1 = \text{ArcCos}\left[\frac{(X_1 - X_{in})\cdot(X_0 - X_{in})}{|X_1 - X_{in}| * |X_0 - X_{in}|}\right] \quad (5)$$

In this particular case, the position of entrance slit or input slit (or waveguide) SL1, exit slit or output slit (or waveguide) SL2 and the angular spacing between the grooves are $X_{in}=(-23.49, 16.45)$, $X_{det}=(-17.26, 33.46)$, and $\Delta\theta_1=4.13°$. In this example, wave-front of the diverging input beam propagating toward the curved grating is sliced into a set of narrow beams with angular extension $\Delta\theta$ by the curved-grating. Each beam with angular extension $\Delta\theta$ undergoes reflective diffraction by each groove. At a particular wavelength, diffraction at a particular groove is equivalent to redirecting to a particular narrow beam into a detector or output slit (or waveguide) SL2 location with $\theta_2$. The position vectors $X_i$'s calculated from Eq. (2) and Eq. (4) are listed in the Table 2. As shown in FIG. 6, the positions of grooves $X_i$ are not on a circle tangent to grating.

| | |
|---|---|
| $X_{-10}$ | (−23.17, 15.28) |
| $X_{-9}$ | (−22.24, 12.89) |
| $X_{-8}$ | (−20.97, 10.60) |
| $X_{-7}$ | (−19.36, 8.43) |
| $X_{-6}$ | (−17.42, 6.44) |
| $X_{-5}$ | (−15.17, 4.65) |
| $X_{-4}$ | (−12.62, 3.10) |
| $X_{-3}$ | (−9.80, 1.83) |
| $X_{-2}$ | (−6.74, 0.87) |
| $X_{-1}$ | (−3.60, 0.14) |
| $X_0$ | (0.00, 0.00) |
| $X_1$ | (3.60, 0.14) |
| $X_2$ | (7.30, 0.70) |
| $X_3$ | (11.06, 1.70) |
| $X_4$ | (14.83, 3.13) |
| $X_5$ | (18.57, 5.02) |
| $X_6$ | (22.22, 7.36) |
| $X_7$ | (25.73, 10.16) |
| $X_8$ | (29.06, 13.39) |
| $X_9$ | (32.16, 17.06) |
| $X_{10}$ | (34.98, 21.15) |

The above example has been used for illustration purposes only and should not be construed in any way as limiting the scope of the invention.

In an alternative embodiment, the High-Resolution Compact Curved Grating has Constant Arc and the Detector or output slit (or waveguide) is located on a Circle tangent to the grating-center curve. This embodiment is described below in detail.

In this exemplary embodiment, both entrance slit or input slit (or waveguide) 502 and detector or output slit (or waveguide) 506 are located on a circle tangent to the grating-center curve as in the case of Rowland design mentioned earlier. However, grooves in this curved-grating are located such that the arc-length of each groove is the same (the Constant-Arc Case). As a result, grooves are not located on a circle nor are spaced with equal distance.

There are two commonly used shapes of grooves in the grating used in the free-space spectrometer. They are straight line and sinusoidal shape. These two shapes are widely used because of ease of manufacturing process. For a curved-grating, ideal shape of reflecting surface not a straight line, but a curved shape of the reflecting surface not a straight line, but a curved shape that can image entrance slit or input slit (or input waveguide mouth) 502 at detector or output slit (or output waveguide mouth) 506 location. Ideal aberration-free curved mirror is an ellipse with its focal point located at source and image. Therefore, as shown in FIG. 6, the ideal shape of the groove at $X_i$ in a curved-grating is a section of ellipse 604 passing through $X_i$ with its two focal points (C1 602, C2 603) at the input and output slits (SL1, SL2). That is, if the focal point C1 is at SL1 and C2 is at SL2 for ellipse 604 passing though groove at $X_i$, then the curved line segment $G_i$ 601 of the ellipse at $X_i$ will be the idea shape for the grove at $X_i$. In this embodiment, elliptic shape is used for each groove and the length of this elliptic shape in each groove is kept constant (constant arc). Center positions of the grooves $X_i$'s in this example are determined so that the length of each elliptic groove is the same.

More generally, the geometric specification of the HR-CCG with constant arc-length (the Constant-Arc Case) and detector or output slit (or waveguide) 506 at a circle tangent to the grating-center curve is as described below.

First, entrance slit or input slit (or waveguide) 502 is located on a circle tangent to the grating-center curve (so-called tangent circle). Therefore, the angle $\theta_1$ and the distance $S_1$ of entrance slit or input slit (or waveguide) 502 with respect to the grating center is related by $S_1 = R*Cos(\theta_1)$, where R is the radius of curvature of the grating center.

Second, the location of detector or output slit (or waveguide) can be adjusted in order to have the best performance for a particular design goal. Thus, the location of detector or output slit (or waveguide) 506, specified by the angle $\theta_2$ with respect to the normal of grating center 504 and the distance $S_2$ from the grating center is not necessarily on the same circle where entrance slit or input slit (or waveguide) 502 is located, nor on any other circle.

Third, the relation between $\theta_1$, $\theta_2$, and the initial grove spacing d is given by the grating formula $d*(Sin(\theta_2)-Sin(\theta_1)) = m*\lambda_c/n$ where m is the diffraction order, n is the effective refractive index of propagation of the medium, and $\lambda_c$ is the center of the operation wavelength.

Fourth, initial groove positions are $X_0(0,0)$, $X_1=(d, R-(R^2-d^2)^{1/2})$ and $X_{-1}=(-d, R-(R^2-d^2)^{1/2})$ With these position vectors, three initial grooves are located on a circle of radius R and have the initial groove spacing of d at the grating center. This circle segment of radius R at the grating center then forms the grating-center curve.

Fifth, the location of other grooves $X_i$'s are obtained by the following two conditions. The first condition being the path-difference between adjacent grooves should be an integral multiple of the wavelength in the medium, which s mathematically expressed as $$[d_1(\theta_1,S_1,X_i)+d_2(\theta_2,S_2,X_i)]-[d_1(\theta_1,S_1,X_{i-1})+d_2(\theta_2,S_2,X_{i-1})]=m*\lambda/n, \quad (6)$$

The second condition being the arc lengths of all the grooves are the same throughout the HR-CCG. This second condition can be mathematically expressed as $$\Delta S_i = |X_i - X_{in}| * ArcCos\left[\frac{\left(\frac{X_{i-1}+X_i}{2} - X_{in}\right) \cdot \left(\frac{X_i+X_{i+1}}{2} - X_{in}\right)}{\left|\frac{X_{i-1}+X_i}{2} - X_{in}\right| * \left|\frac{X_i+X_{i+1}}{2} - X_{in}\right|}\right] = \text{constant} \quad (7)$$

where $\Delta S_i$ is the arc-length of $i^{th}$ groove. This equation requires the knowledge of $X_{i+1}$, which is still unknown. However, with the constraint the fact that each $X_i$ is located at the center of the groove, the above expression can be reduced to the following expression without $X_{i+1}$.

$$\Delta S_i = |X_i - X_{in}| * ArcCos\left[\frac{\left(\frac{X_{i-1}+X_i}{2} - X_{in}\right) \cdot (X_i - X_{in})}{\left|\frac{X_{i-1}+X_i}{2} - X_{in}\right| * |X_i - X_{in}|}\right] = \text{constant} \quad (8)$$

Figure 7:
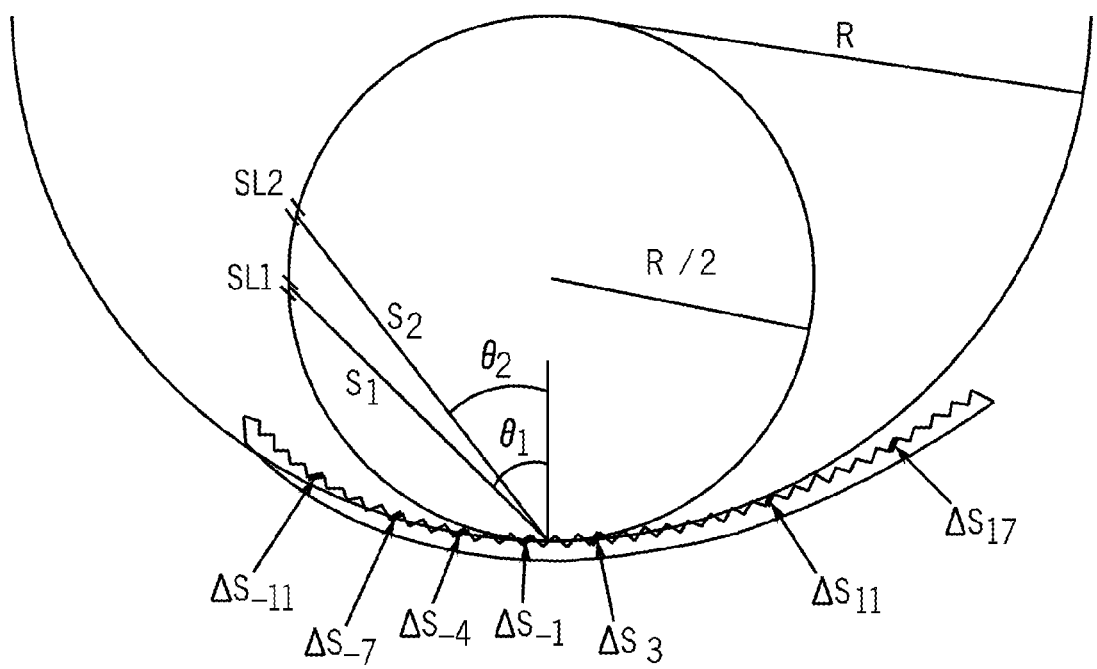
FIG. 7 shows a High Resolution Compact Curved Grating with Constant Arc (the Constant-Arc Case), the detector or output slit (or waveguide) SL2 and the input slit (or waveguide) SL1 being present on a tangent circle, in accordance with an embodiment of the present invention.

FIG. 7 shows a specific example of the HR-CCG with constant arc-length of the grooves and detector or output slit (or waveguide) SL2 at a tangent circle. The radius of curvature at the grating center is R=100 μm. Entrance slit or input slit (or waveguide) SL1 is located at an angle $\theta_1=45°$ from grating normal and a distance $S_1=70.71$ μm from the grating center. Detector or output slit (or waveguide) SL2 is located at an angle $\theta_2$ 37.37 and distance $S_2=79.47$ μm from the grating center. Both entrance slit or input slit (or waveguide) SL1 and exit slit or output slit (and waveguide) SL12 are located on a tangent circle of radius 50 μm. The groove spacing at the grating center is chosen to be d=4.2 μm so that diffraction order m=12 is directed toward detector or output slit (or waveguide) SL2 located at an angle $\theta_2$ from the grating normal. Three initial grooves are located at $X_0=(0, 0)$, $X_1=(4.2, 0.008)$, and $X_{-1}=(-4.2, 0.008)$ which form a circle of radius R=100 μm. Other groove locations $X_i$'s are obtained with the condition of arc-length of each groove $\Delta S_i$ is the same, i.e. $\Delta S_1$. Equation (2) and (6) are simultaneously solved for a $X_1$ with $X_{in}=(-50, 50)$, $X_{det}=(-48.24, 63.15)$, and $\Delta S_1=4.201$ for a given $X_{i-1}$. Groove locations, $X_i$'s calculated in this method are listed in Table 3. As shown in FIG. 7, grooves in this grating are not located on a tangent circle.

| | |
|---|---|
| $X_{-15}$ | (−55.43, 23.48) |
| $X_{-14}$ | (−52.90, 20.32) |
| $X_{-13}$ | (−50.07, 17.38) |
| $X_{-12}$ | (−46.98, 14.68) |
| $X_{-11}$ | (−43.67, 12.21) |
| $X_{-10}$ | (−40.17, 9.98) |
| $X_{-9}$ | (−36.52, 7.99) |
| $X_{-8}$ | (−32.74, 6.24) |
| $X_{-7}$ | (−28.84, 4.72) |
| $X_{-6}$ | (−24.86, 3.43) |

-continued

| | |
|---|---|
| $X_{-5}$ | (−20.81, 2.35) |
| $X_{-6}$ | (−16.71, 1.48) |
| $X_{-5}$ | (−20.81, 2.35) |
| $X_{-4}$ | (−16.71, 1.48) |
| $X_{-3}$ | (−12.57, 0.82) |
| $X_{-2}$ | (−8.39, 0.36) |
| $X_{-1}$ | (−4.20, 0.09) |
| $X_0$ | (0.00, 0.00) |
| $X_1$ | (4.20, 0.09) |
| $X_2$ | (8.39, 0.35) |
| $X_3$ | (12.57, 0.77) |
| $X_4$ | (16.73, 1.34) |
| $X_5$ | (20.86, 2.07) |
| $X_6$ | (24.97, 2.94) |
| $X_7$ | (29.04, 3.96) |
| $X_8$ | (33.07, 5.10) |
| $X_9$ | (37.06, 6.37) |
| $X_{10}$ | (41.01, 7.76) |
| $X_{11}$ | (44.91, 9.28) |
| $X_{12}$ | (48.77, 10.90) |
| $X_{13}$ | (52.57, 12.63) |
| $X_{14}$ | (56.33, 14.47) |

The above example has been illustration purposes only and should not in any way limiting the scope of the above-described embodiment or invention as a whole.

Figure 1A:
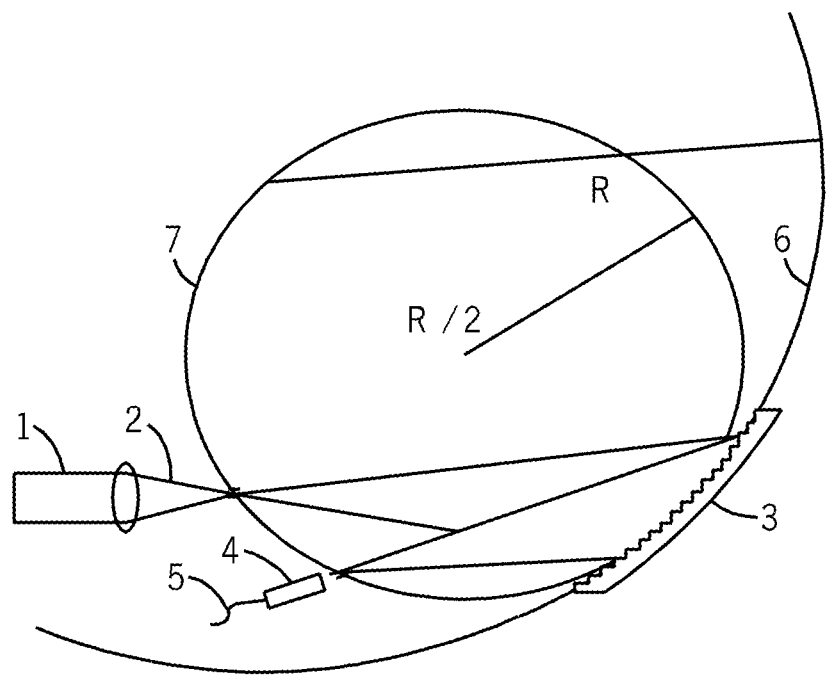
FIG. 1A and FIG. 1B show different views of a curved grating having the Rowland design.
Figure 1B:
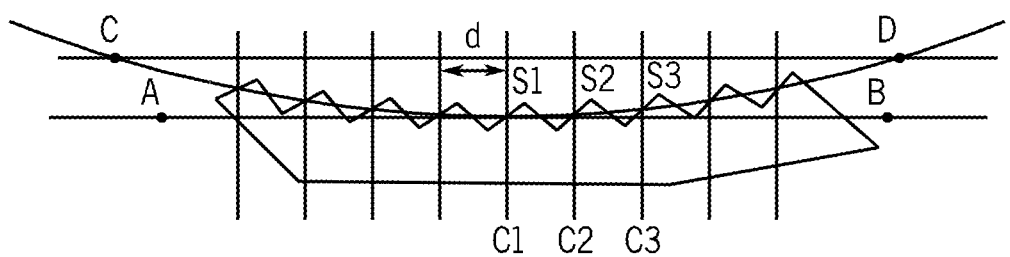
Figure 1C:
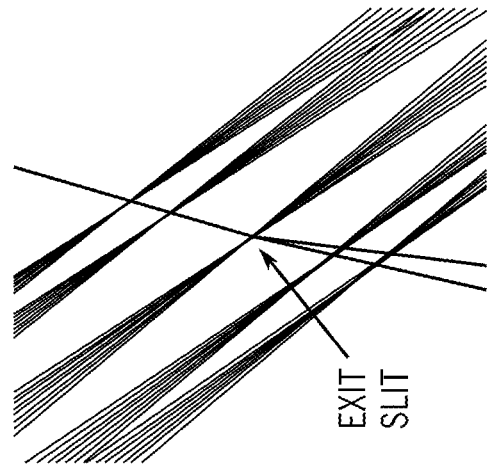
FIG. 1C shows ray-tracing for a Rowland grating design indicating focusing distortion or aberration at the exit slit for the cases where the input divergence angles are 4 DEG (left), 8 DEG (middle), and 16 DEG (right)
Figure 1C:
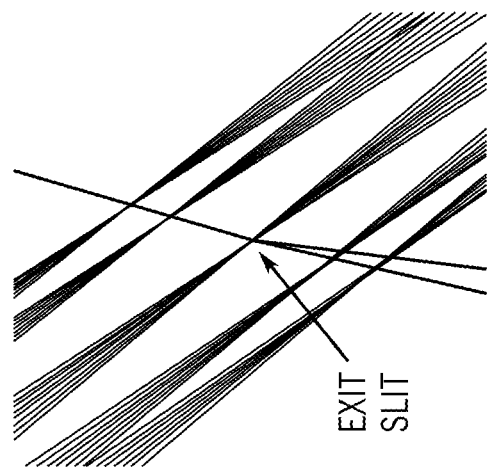
Figure 1C:
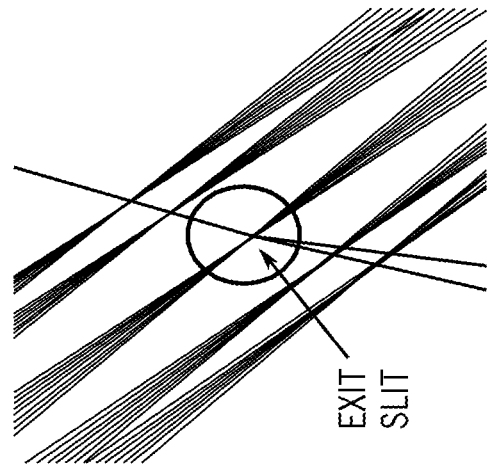
Figure 2:
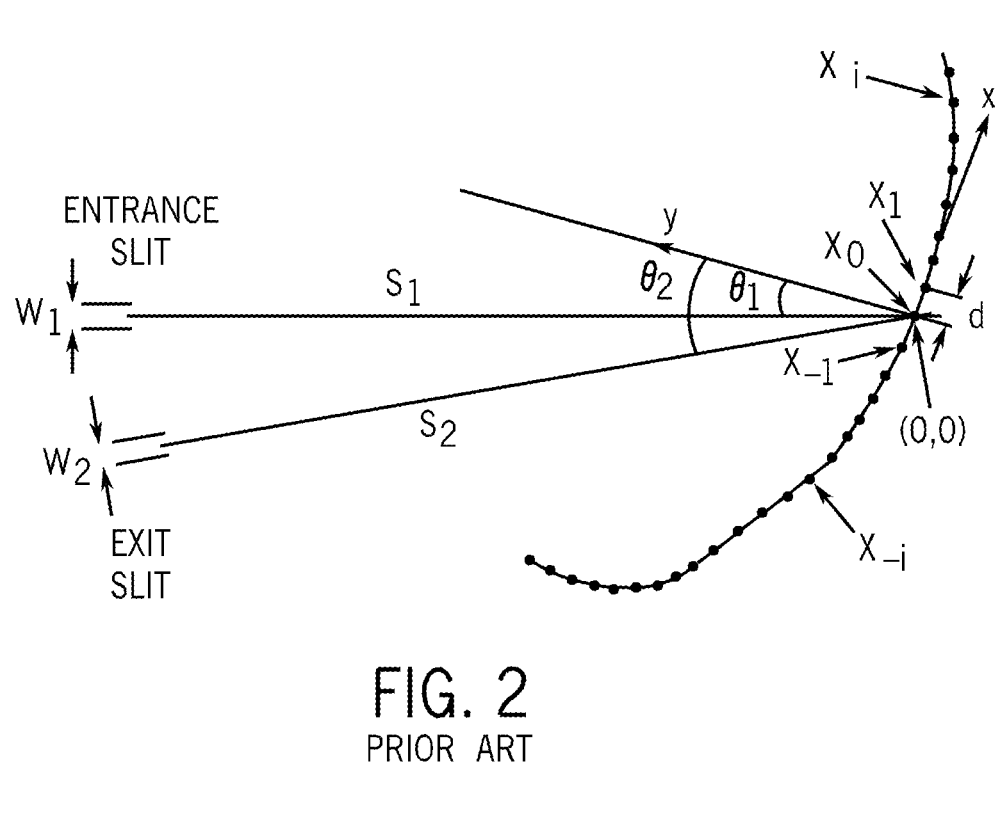
FIG. 2 shows the general specification of a curved-grating spectrometer.
Figure 3:
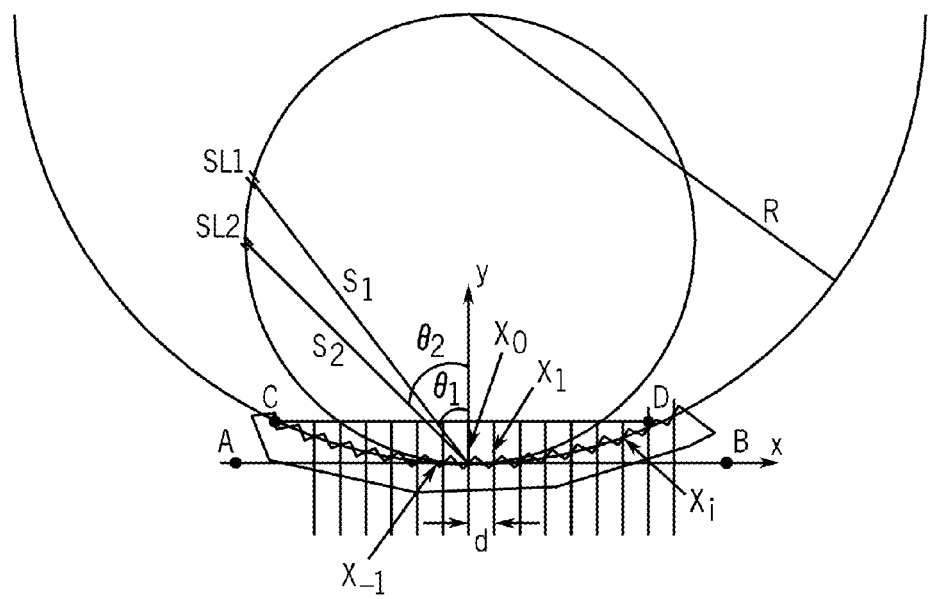
FIG. 3 illustrates the Rowland configuration specification for a Rowland curved grating.
Figure 4:
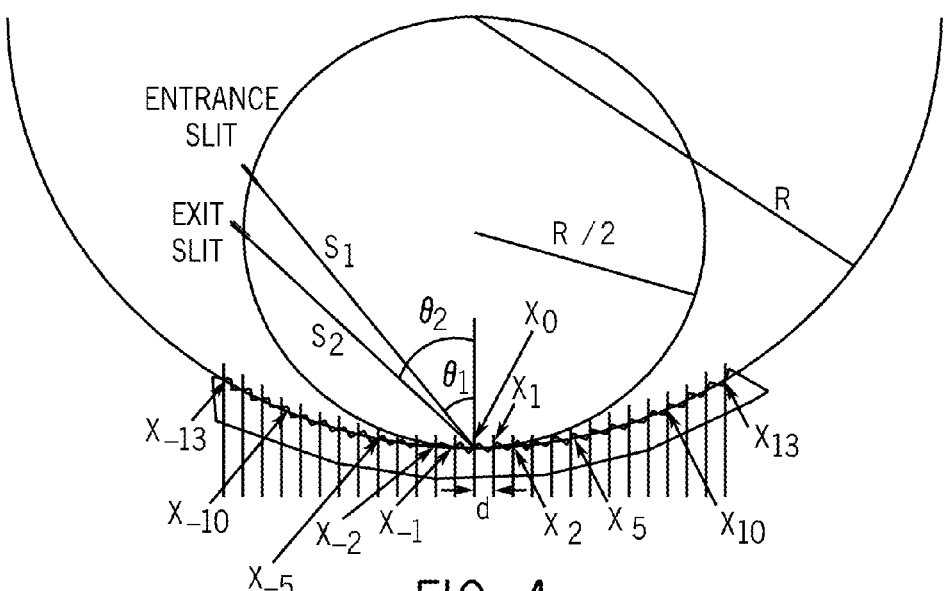
FIG. 4 shows a specific case of Rowland design curved grating.
Figure 8A:
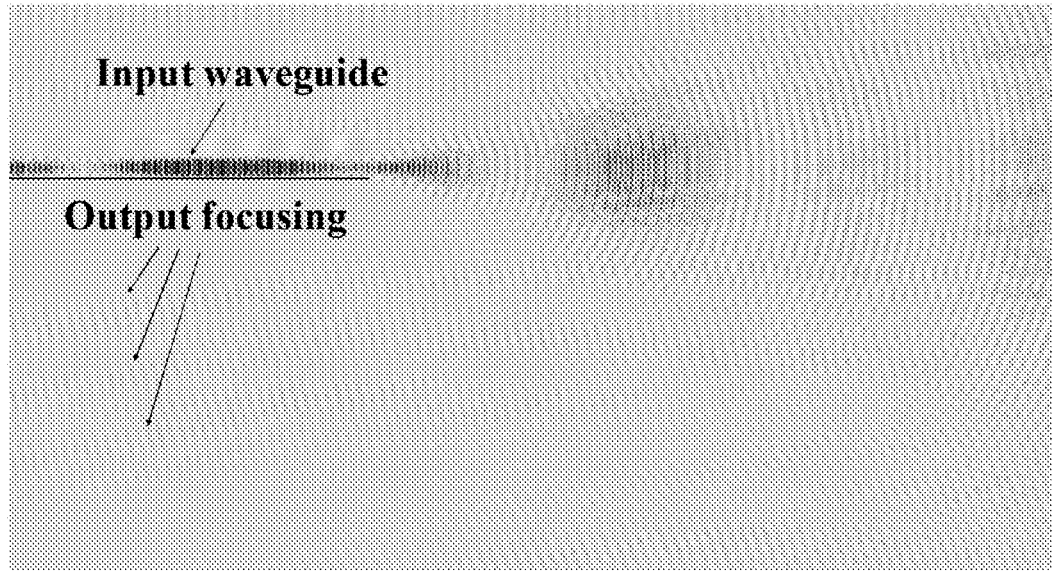
FIGS. 8A and 8B show a comparison between the Rowland design and the High Resolution Compact Curved Grating with constant groove (arc) length in accordance with the present invention.
Figure 8B:
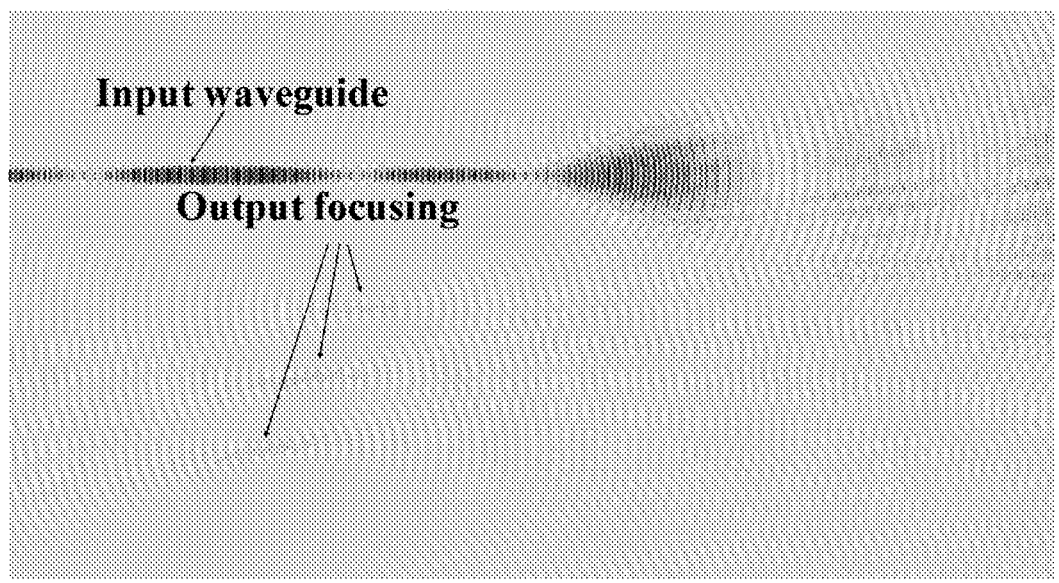

The performance of the HR-CCG with the constant arc-length and detector or output slit (or waveguide) on a tangent circle is compared with a Rowland design with the same parameters such as $\theta_1$, $S_1$, $\theta_2$, $S_2$, R, m, d, and $\lambda_c$. It is a direct comparison of a Rowland curved-grating spectrometer described in FIG. 3 and a HRC-curved grating spectrometer described in FIG. 7. All the configuration parameters are the same for these two spectrometers except the grating itself. Particularly, the imaging properties, that is, how well entrance slit or input slit (or waveguide) SL1 is sharply imaged at the detector or output slit (or waveguide) location without aberration are compared. Imaging properties ultimately determine the resolution of a spectrometer. Finite Difference Time Domain (FDTD) method is used as a calculation method. FDTD is a Maxwell-equation solver, which evaluates electromagnetic wave within a spatial region for a certain period of time. By choosing a fine spatial grid size and temporal calculation step, the equation for an electromagnetic wave and its propagation can be solved with arbitrarily fine resolution. Imaging properties in these two curved-grating spectrometers is calculated by propagating a monochromatic light into entrance slit or input slit (or waveguide) 502 of each spectrometer. FDTD is run until the interference of beams from the entire grating groove is completed and forms an image of entrance slit or input slit (or waveguide) 502 at the detector or output slit (or waveguide) location. The resulting snapshot of electric-field near the detector or output slit (or waveguide) is taken for these two cases as shown in FIG. 8. Entrance slit or input slit (or waveguide) 502 width of 1 μm is used for both simulations and the wavelength of λ=1530, 1550, 1570 nm is used. In FIG. 8A shows the snapshot of electric field at the detector or output slit (or waveguide) location for the Rowland design described in FIG. 3. As expected, the image of the entrance slit or input slit (or input waveguide mouth) is blurred due to imperfect grating. For 1 μm entrance slit, the full diffraction angle is about $\theta_{div}$=50° and therefore, Rowland design breaks down. FIG. 8B shows the snapshot of electric field for the HR-CCG with constant arc-length grooves and detector or output slit (or waveguide) on a tangent circle. In this case, a sharp aberration free image of entrance slit or input slit (or input waveguide mouth) is formed at the detector or output slit (or waveguide) location. The RS factor (RS=(Δλ/λ)×(L/λ)) in this case is 0.6.

In an alternate embodiment, High-Resolution Compact Curved Grating has a constant arc with the detector or output slit (or waveguide) being present in-line. With reference to FIG. 7, this embodiment can be realized if the input slit (or input waveguide) and exit slits (or outout slits or waveguides) are located along a line such that S1≈S2. In another alternate embodiment, High-Resolution Compact Curved Grating has a constant arc with detector or output slit (or waveguide) SL2 present at an arbitrary location.

In another alternative embodiment, High-Resolution Compact Curved Grating has a constant angle and detector or output slit (or waveguide) SL2 present on the circle of radius R12, as depicted in FIG. 6. In this embodiment, each groove surface has an angular extension $(\Delta\theta)_i$ from entrance slit or input slit (or waveguide) SL1. In this example, the angular extensions $(\Delta\theta)_i$ are kept constant for all grooves. In addition, both entrance slit or input slit (or waveguide) SL1 and detectors or output slits or waveguides) SL2 are located on or near a circle of radius R/2, where R is the radius of a circle formed by three initial groove locations X0, X1, and X2.

In as yet another alternate embodiment, High-Resolution Compact Curved Grating has a constant angle with detector or output slit (or waveguide) SL2 present at an arbitrary location.

Figure 14:
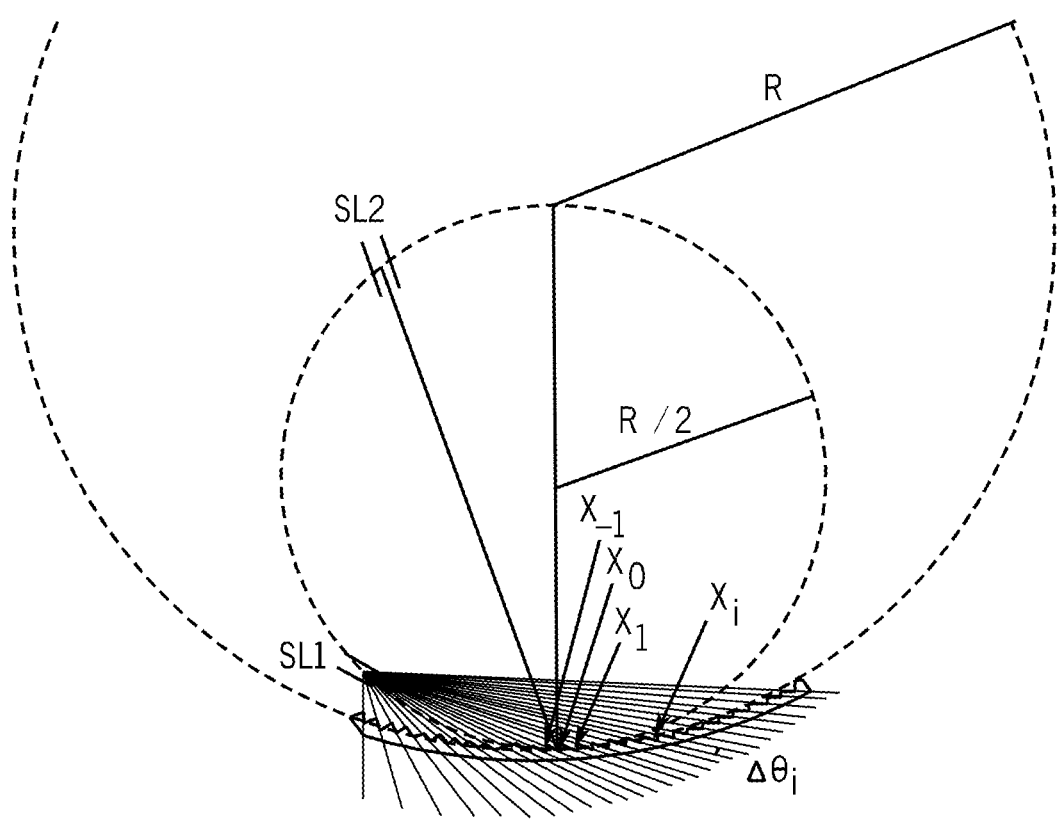
FIG. 14 illustrates a high resolution compact curved grating.

In as yet another alternate embodiment, High-Resolution Compact Curved Grating has groves lying on or near the circle of radius R (the near-Rowland Case) where R is the radius of a circle formed by three initial groove locations X0, X1, and X2, and the detector or output slit (or waveguide) SL2 is present on the circle of radius R/2, as depicted in FIG. 14. In this embodiment, each groove surface has an angular extension $(\Delta\theta)_i$ from entrance slit or input slit (or waveguide). In this example, the angular extensions $(\Delta\theta)_i$ are chosen so that each groove lies on or near the circle of radius R. More specifically, the location of other grooves $X_i$'s are obtained by the following two conditions. The first condition being the path-difference between adjacent grooves should be an integral multiple of the wavelength in the medium, which is mathematically expressed as $$[d_1(\theta_1,S_1,X_i)+d_2(\theta_2,S_2,X_i)]-[d_1(\theta_1,S_1,X_{i-1})+d_2(\theta_2,S_2,X_{i-1})]=m^*\lambda/n \quad (9)$$

Secondly, the angular locations of the grooves are chosen so that each groove is located at or near the circle of radius R throughout the HR-CCG, where R is the radius of a circle formed by three initial groove locations X0, X1, and X2.

In another alternate embodiment, the High-Resolution Compact Curved Grating with groves on or near the circle of radius R (the near-Rowland case) has detector or output slit (or waveguide) present at an arbitrary location.

Figure 15:
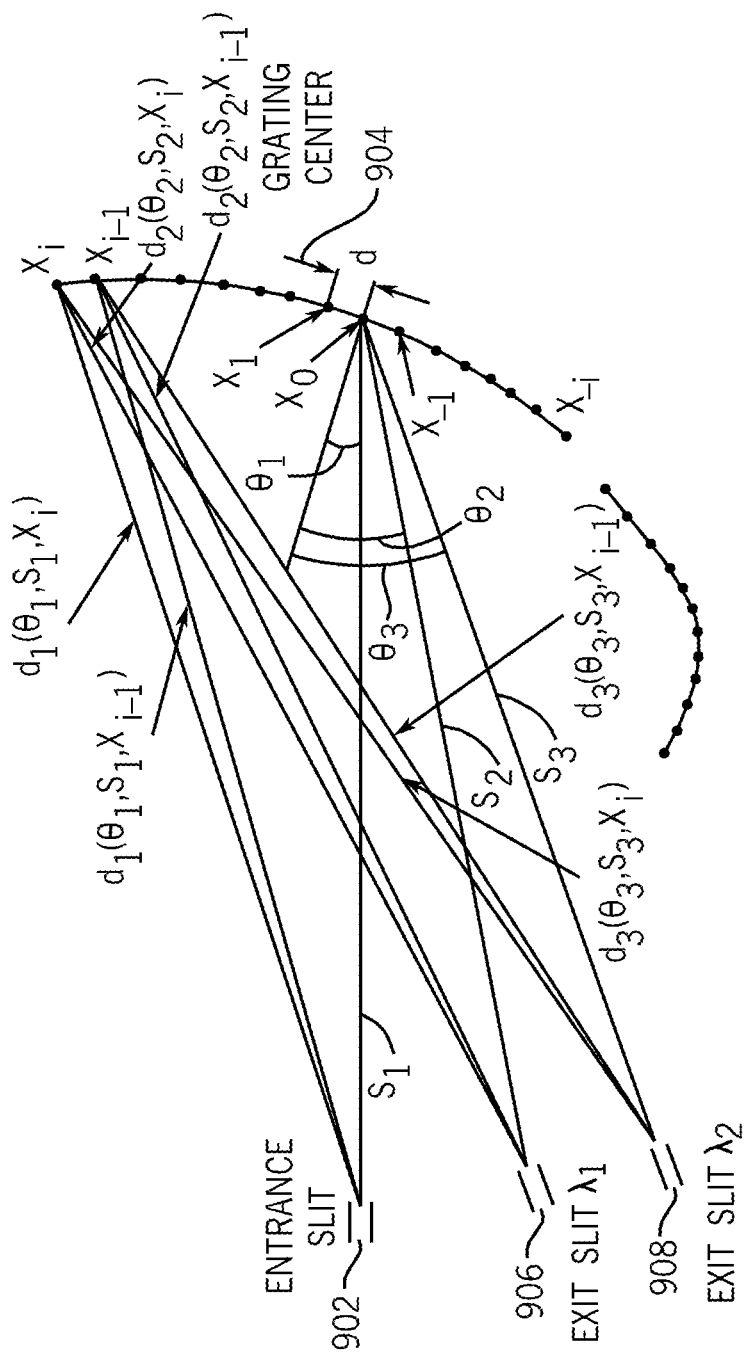
FIG. 15 illustrates a curved grating spectrometer configured as a wavelength multiplexer/demultiplexer.

FIG. 15 shows an additional embodiment of a HR-CCG and an associated spectrometer or wavelength Mux/deMux utilizing the HR-CCG, called the Broadband Two-Wavelength Case. The HR-CCG spectrometer or wavelength Mux/deMux having the geometric configuration as described below.

First, the location of the entrance slit or input slit (or waveguide) 902 is adjustable in order to have the best performance for a particular design goal. Thus, the location of a entrance slit or input slit (or waveguide) 902 specified by angle $\theta_1$ with respect to the normal of grating center 904 and the distance $S_1$ from grating center 904 is not necessarily on a circle as in the case for Rowland design mentioned in the prior art.

Second, the location of the detector or output slit (or waveguide) for two different wavelengths λ1 and λ2 is adjustable in order to have the best performance for a particular design goal. The location of the detector or output slit (or waveguide) 906 for wavelength λ1 is specified by the angle $\theta_2$ with respect to the normal of grating center 904 and the distance $S_2$ from the grating center. The location of detector or output slit (or waveguide) 908 for wavelength $\lambda_2$ is specified by the angle $\theta_3$ with respect to the normal of grating center 904 and the distance $S_3$ from the grating center. Note that 906, and 908 are not necessarily on the same circle where entrance slit or input slit (or waveguide) 902 is located, nor on any other circle.

Third, the relation between $\theta_1, \theta_2, \theta_3$ and the initial groove spacing d is given by the grating formula, $$d*(\mathrm{Sin}(\theta_2)-\mathrm{Sin}(\theta_1))=m*\lambda_1/n \tag{10}$$

$$d*(\mathrm{Sin}(\theta_3)-\mathrm{Sin}(\theta_1))=m*\lambda_2/n \tag{11}$$

where m is the diffraction order and n is the effective refractive index of propagation of the medium.

Fourth, locations of other grooves $X_i$'s are obtained by two conditions. The first of these conditions being that the path-difference between adjacent grooves should be an integral multiple of the wavelength $\lambda_1$ in the medium. The first condition can be expressed mathematically by:

$$[d_1(\theta_1,S_1,X_i)+d_2(\theta_2,S_2,X_i)]-[d_1(\theta_1,S_1,X_{i-1})+d_2(\theta_2,S_2,X_{i-1})]=m*\lambda_1/n, \tag{12}$$

where $d_1(\theta_1,S_1,X_i)$ is the distance from the i-th groove located at $X_i$ to entrance slit or input slit (or waveguide) 902 specified by $\theta_1$ and $S_1$, $d_2(\theta_2,S_2,X_i)$ is the distance from the i-th groove located at $X_i$ to detector or output slit (or waveguide) 906 specified by $\theta_2$ and $S_2$, m is the diffraction order, and n is the effective refractive index of propagation of the medium. This mathematical expression is numerically exact for the optical path difference requirement in the diffraction grating and is actively adjusted for every groove on HR-CCG.

The second of these conditions being that the path-difference between adjacent grooves should be an integral multiple of the wavelength $\lambda_2$ in the medium. The second condition can be expressed mathematically by:

$$[d_1(\theta_1,S_1,X_i)+d_3(\theta_3,S_3,X_i)]-[d_1(\theta_1,S_1,X_{i-1})+d_3(\theta_3,S_3,X_{i-1})]=m*\lambda_2/n, \tag{13}$$

where $d_3(\theta_3,S_3,X_i)$ is the distance from the i-th groove located at $X_i$ to detector or output slit (or waveguide) 908 specified by $\theta_3$ and $S_3$. This mathematical expression is numerically exact for the optical path difference requirement in the diffraction grating and is actively adjusted for every groove on HR-CCG. Solving Equations (12) and (13) together, exact locations of other grooves $X_i$'s can be obtained.

Figure 16:
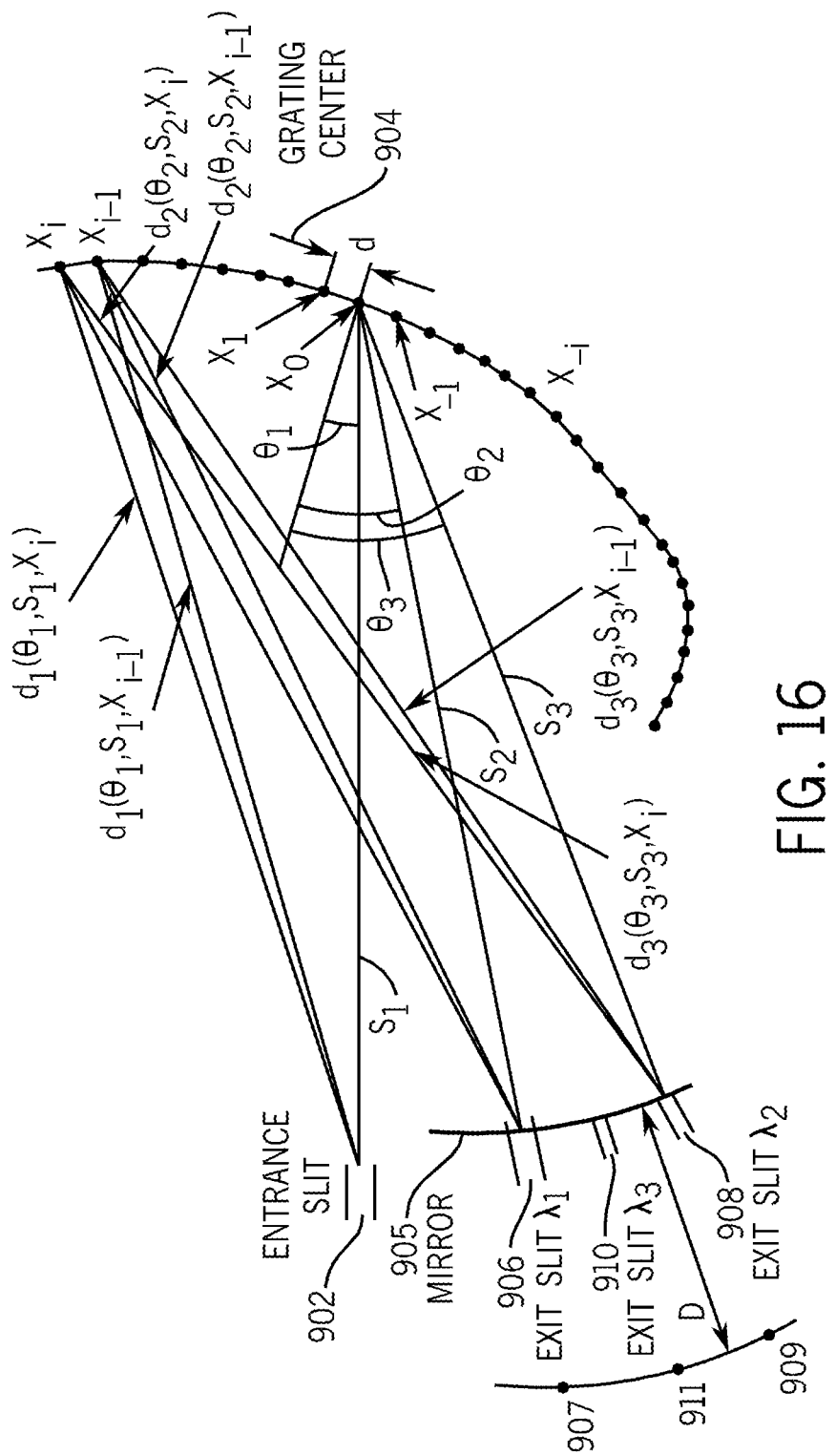
FIG. 16 illustrates a curved grating spectrometer configured as a wavelength multiplexer/demultiplexer.

FIG. 16 shows an additional embodiment of a HR-CCG and an associated spectrometer or wavelength Mux/deMux utilizing the HR-CCG. In this embodiment, the distance $S_2$ from the grating center to the location of detector or output slit (or waveguide) 906 for wavelength $\lambda_1$ is equal to the distance $S_3$ from the grating center to the location of detector or output slit (or waveguide) 908 for wavelength $\lambda_2$. In other words, the location of detector or output slit (or waveguide) 906 for wavelength $\lambda_1$ and the location of detector or output slit (or waveguide) 908 for wavelength $\lambda_2$ is on the same circle centered at grating center $X_0$ with distance $S_2=S_3$. In this case, one can place a curved reflecting mirror 905 passing through points 906 and 908, with the nominal direction of the curve pointing towards the grating center at 906 and 908. As light at wavelength $\lambda_1$ enters entrance slit or input slit (or waveguide) 902 and is diffracted by the grating towards 906, it will hit the mirror and be reflected back by the mirror along the same path back to the grating and further focusing back to the entrance slit or input slit (or waveguide) 902. Similarly, as light at wavelength $\lambda_2$ enters entrance slit or input slit (or waveguide) 902 and is diffracted by the grating towards 908, it will hit the mirror and be reflected back by the mirror along the same path back to the grating and further focusing back to the entrance slit or input slit (or waveguide) 902.

In another embodiment, the grating so generated gives rise to a third focal spot for a third input wavelength $\lambda_3$ that has a value between wavelength $\lambda_1$ and wavelength $\lambda_2$. The location of this third focal spot is 910 and is specified by angle $\theta_4$ with respect to the normal of grating center 904 and the distance $S_4$ from grating center 904. The three output slit (or waveguide) locations 906, 910, 908, can be made to be located on a circle of radius $R_{out}$, called the radius of curvature of the output plane or output-plane radius.

In one embodiment, $S_2$ and $S_3$ are chosen so that the locations 906, 910, 908 lie on a near straight line so that $R_{out}$ is large. This will ensure that the three focal points will form a nearly flat surface of reflection so that the focused beams with plane wavefront at their focal points will be reflected directly back to the entrance slit 902. Each of the reflected beam will trace back its own original physical beam propagation and hence will achieve maximum reflection back into the input slit or waveguide 902

As shown in FIG. 16, in as yet another embodiment, the mirror locations are displaced at distance D away from locations 906, 910, and 908 so that the new locations 907, 911, and 909 lie on a new curved line 907-911-909 also with radius of curvature $R_{out}$. A curve mirror reflecting surface is then placed or fabricated at curved line 907-911-909. The beam at $\lambda_1$ will hit the curved mirror at 907, beam at $\lambda_3$ will hit the curved mirror at 911, and beam at $\lambda_2$ will hit the curved mirror at 909. Due to the displacement D from their original focal points, these three beams will attain a curved wavefront with a common beam phase-front radius of curvature $R_{beam}$ due to diffraction. D is chosen to make $R_{beam}=R_{out}$, so that the outout plane's radius of curvature matches the beam's radius of curvature. This will again ensure that each of the reflected beams will trace back its own original physical beam propagation and hence will achieve maximum reflection back into the input slit or waveguide 902

While preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A wavelength multiplexer/demultiplexer suitable for analyzing a spectra composition of an optical beam, the wavelength multiplexer/demultiplexer enabling a detection of light of a particular wavelength, the wavelength multiplexer/demultiplexer comprising:

an input slit for allowing an entry of the optical beam into a spectrometer, a location of the input slit, being adjustable, and further the location of the input slit specified by a first angle with respect to a normal of a rating center of a curved grating and a first distance from the grating center;

a first output slit for allowing the exiting of a first exit optical beam having a first wavelength, a location of the first output slit being adjustable, and further the location of the first output slit specified by a second angle with respect to the normal of the grating center of the curved gratin and a second distance from the grating center; and a second output slit for allowing the exit of a second exit optical beam having a second wavelength, a location of the second output slit being adjustable, and further the location of the second output slit specified by a third angle with respect to the normal of the grating center of the curved grating and a third distance from the grating center, wherein the second distance and third distance are nearly equal so that both slits are near a circle with radius $R_{out}$ centered at the grating center.

2. The wavelength multiplexer demultiplexer as recited in claim 1, wherein the second distance and third distance are adjusted so that a mirror placed at the first output slit lacing the grating center will reflect light back to the input slit with maximum power through the input slit.

3. The wavelength multiplexer/demultiplexer as recited in claim 1, wherein the second distance and third distance are adjusted so that a mirror placed at the second output slit facing the grating center near the circle with radius $R_{out}$ centered at the grating will reflect light back to the input slit with maximum power through the input slit.

4. The wavelength multiplexer/demultiplexer as recited in claim 1, wherein the second distance and third distance are adjusted so that a mirror facing the grating center placed at the first output slit near the circle with radius $R_{out}$ centered at the grating and a mirror facing the grating center placed at the second output slit near the circle with the radius $R_{out}$ centered at the grating center will both reflect light back to the input slit with maximum power through the input slit.

5. The wavelength multiplexer/demultiplexer as recited in claim 1, wherein a third output slit for allowing the exit of a third optical beam having a third wavelength having a value between the first wavelength and second wavelength, wherein the first slit, second slit, and third slit lie on a circle centered at the grating center with radius of curvature $R_{out}$, and the output plane is fabricated with a curved reflecting surface to reflect optical beams from the input slit back to the grating center and the input slit, and further wherein the second and third distance are adjusted to deviate from the focal distance of the first exit optical beam and second exit optical beam so that the beam phase-front radius of curvature $R_{beam}$ of the first exit optical beam at the first exit slit and the second exit optical beam at the second exit slit have about the same value as the output-plane radius of curvature $R_{out}$.

6. The wavelength multiplexer/demultiplexer as recited in claim 1, wherein the wavelength multiplexer/demultiplexer is an isolated optical wavelength multiplexer/demultiplexer using discrete components, wherein the discrete components are any of slits, gratings, spectrometer casing, detector, detector array and motor drive.

7. The wavelength multiplexer/demultiplexer as recited in claim 1, wherein the wavelength multiplexer/demultiplexer is an integrated optical wavelength for multiplexer/demultiplexer using an optical waveguide as the input slit and an optical waveguide for the output slits.

* * * * *